(12) United States Patent
Kley

(10) Patent No.: US 7,109,482 B2
(45) Date of Patent: Sep. 19, 2006

(54) OBJECT INSPECTION AND/OR MODIFICATION SYSTEM AND METHOD

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 0 days.

(21) Appl. No.: 10/875,151

(22) Filed: Jun. 22, 2004

(65) Prior Publication Data

US 2005/0056783 A1    Mar. 17, 2005

Related U.S. Application Data

(63) Continuation of application No. 10/019,009, filed as application No. PCT/US00/18041 on Jun. 30, 2000, now abandoned.

(60) Provisional application No. 60/142,178, filed on Jul. 1, 1999.

(51) Int. Cl.
  *G01B 21/30* (2006.01)
(52) U.S. Cl. .................. 250/306; 250/307; 73/105
(58) Field of Classification Search ............... 250/306, 250/307, 309; 73/105
  See application file for complete search history.

(56) References Cited

U.S. PATENT DOCUMENTS

| | | |
|---|---|---|
| 3,586,865 A | 6/1971 | Baker et al. |
| 3,812,288 A | 5/1974 | Walsh et al. |
| 4,115,806 A | 9/1978 | Morton |
| 4,604,520 A | 8/1986 | Pohl |
| 4,672,559 A | 6/1987 | Jansson et al. |
| 4,673,477 A | 6/1987 | Ramalingram et al. |
| RE32,457 E | 7/1987 | Matey |
| 4,681,451 A | 7/1987 | Guerra et al. |
| 4,697,594 A | 10/1987 | Mayo, Jr. |
| 4,793,201 A | 12/1988 | Kanai et al. |
| 4,831,614 A | 5/1989 | Duerig |
| 4,866,986 A | 9/1989 | Cichanski |
| 4,907,195 A | 3/1990 | Kazan et al. |
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohl |
| 5,047,633 A | 9/1991 | Finlan et al. |
| 5,047,649 A | 9/1991 | Hodgson et al. |
| 5,072,116 A | 12/1991 | Kawade et al. |

(Continued)

FOREIGN PATENT DOCUMENTS

EP     0325056     7/1989

(Continued)

OTHER PUBLICATIONS

Ager et al., "Multilayer hard carbon films with low wear rates," *Surface and Coatings Technology*, 91:91-94 (1997).

(Continued)

*Primary Examiner*—Kiet T. Nguyen
(74) *Attorney, Agent, or Firm*—Townsend and Townsend and Crew LLP

(57) ABSTRACT

A scanning probe microscope system (100) includes an objective lens (147), a clamping circuit (404), a tip deflection measurement circuit (421), a cantilever (136), and a probe (137) for modifying and inspecting an object (102) disposed on a stage (129).

31 Claims, 12 Drawing Sheets

U.S. PATENT DOCUMENTS

| | | | |
|---|---|---|---|
| 5,081,390 A | 1/1992 | Elings et al. |
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,308 A | 9/1992 | Miyauchi |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barret |
| 5,216,631 A | 6/1993 | Sliwa |
| 5,220,555 A | 6/1993 | Yanagisawa |
| 5,231,286 A | 7/1993 | Kajimura et al. |
| 5,241,527 A | 8/1993 | Eguchi |
| 5,249,077 A | 9/1993 | Laronga |
| 5,252,835 A | 10/1993 | Lieber et al. |
| 5,253,515 A | 10/1993 | Toda et al. |
| 5,254,209 A | 10/1993 | Schmidt et al. |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greshner et al. |
| 5,289,004 A | 2/1994 | Okada et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,307,311 A | 4/1994 | Sliwa |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate et al. |
| 5,322,735 A | 6/1994 | Fridez et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsuda |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,502,306 A | 3/1996 | Meisburger et al. |
| 5,506,829 A | 4/1996 | Yagi |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,652,428 A * | 7/1997 | Nishioka et al. ............ 250/307 |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bougoin et al. |
| 5,821,410 A | 10/1998 | Xiang et al. |
| 5,825,670 A | 10/1998 | Chernoff et al. |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 6,031,756 A | 2/2000 | Gimsewski et al. |
| 6,066,265 A | 5/2000 | Galvin et al. |
| 6,101,164 A | 8/2000 | Kado et al. |
| 6,144,028 A | 11/2000 | Kley |
| 6,173,604 B1 | 1/2001 | Xiang et al. |
| 6,199,269 B1 | 3/2001 | Greco et al. |
| 6,201,226 B1 | 3/2001 | Shimada et al. |
| 6,229,138 B1 | 5/2001 | Kley |
| 6,229,607 B1 | 5/2001 | Shirai et al. |
| 6,229,609 B1 | 5/2001 | Muramatsu et al. |
| 6,232,597 B1 | 5/2001 | Kley |
| 6,239,426 B1 | 5/2001 | Muramatsu et al. |
| 6,242,734 B1 | 6/2001 | Kley |
| 6,249,747 B1 | 6/2001 | Bennig et al. |
| 6,252,226 B1 | 6/2001 | Kley |
| 6,265,711 B1 | 7/2001 | Kley |
| 6,281,491 B1 | 8/2001 | Kley |
| 6,337,479 B1 | 1/2002 | Kley |
| 6,339,217 B1 | 1/2002 | Kley |
| 6,340,813 B1 | 1/2002 | Tominaga et al. |
| 6,353,219 B1 | 3/2002 | Kley |
| 6,369,379 B1 | 4/2002 | Kley |
| 6,396,054 B1 | 5/2002 | Kley |
| 6,507,553 B1 | 1/2003 | Kley |
| 6,515,277 B1 | 2/2003 | Kley |
| 6,517,249 B1 | 2/2003 | Doll |
| 6,573,369 B1 | 6/2003 | Henderson et al. |
| 6,614,227 B1 | 9/2003 | Ookubo |
| 6,724,712 B1 | 4/2004 | Kley |
| 6,737,331 B1 | 5/2004 | Lewis et al. |
| 6,752,008 B1 | 6/2004 | Kley |
| 6,787,768 B1 | 9/2004 | Kley et al. |
| 6,802,646 B1 | 10/2004 | Kley |
| 6,813,937 B1 | 11/2004 | Kley |
| 2002/0007667 A1 | 1/2002 | Pohl et al. |
| 2002/0117611 A1 | 8/2002 | Kley |
| 2002/0135755 A1 | 9/2002 | Kley |
| 2002/0189330 A1 | 12/2002 | Mancevski et al. |
| 2003/0012657 A1 | 1/2003 | Marr et al. |
| 2003/0027354 A1 | 2/2003 | Geli |
| 2003/0062193 A1 | 4/2003 | Thaysen et al. |
| 2003/0089182 A1 | 5/2003 | Thaysen et al. |
| 2004/0118192 A1 | 6/2004 | Kley |

FOREIGN PATENT DOCUMENTS

| | | |
|---|---|---|
| JP | 61-133065 | 6/1986 |
| JP | 01-262403 | 10/1989 |
| JP | 7-105580 | 4/1995 |

| WO | WO 96/03641 A1 | 2/1996 |
| WO | WO 97/04449 | 2/1997 |
| WO | WO 98/34092 A2 | 8/1998 |
| WO | WO 01/03157 | 1/2001 |
| WO | WO 03/046473 | 6/2003 |
| WO | WO 04/023490 | 3/2004 |

OTHER PUBLICATIONS

Betzig et al "Near-Field Optics: Microscopy Spectroscopy and Surface Modification Beyond the Diffraction Limit" Science 257:189-195 (1992).

Dai et al. "Nanotubes as nanoprobes in scanning probe microscopy," Nature 384:147-150 (1996).

Davis "Deposition characterization and device development in diamond silicon carbide and gallium nitride thin films" J. Vac. Sci. Technol. 11:829-837 (1993).

Diaz et al. "An Improved Fabrication Technique for Porous Silicon," Rev. Sci. Instrum.64: 507-509 (1993).

Jaschke et al. "Deposition of Organic Material by the Tip of a Scanning Force Microscope," Langmuir 11:1061-1064 (1995).

Givargizov et al "Growth of diamond particles on sharpened silicon tips" Materials Letters 18:61-63 (1993).

Gomyou et al. "Effect of Electrochemical Treatments on the Photoluminescence from Porous Silicon," J. Electrochem. Soc., 139: L86-L88 (1992).

Nossarzewska-Orlowska et al. "Photoluminescence Properties of Porous Silicon Prepared by Electrochemical Etching of Si Epitaxial Layer," Acta Physica Polonica A 84:713-716 (1993).

Rasmussen et al. "Fabrication of an All-metal Atomic Force Microscope Probe," IEEE Proceedings of the International Conference on Solid State Sensors and Actuators, Chicago, (1997).

Rossow et al. "Influence on the Formation Conditions on the Microstructure of Porous Silicon Layers Studied by Spectroscopic Ellipsometry," Thin Solid Films 255:5-8 (1995).

Smestad et al. "Photovoltaic Response in Electrochemically Prepared Photoluminescent Porous Silicon," Solar Energy Materials and Solar Cells 26:277-283 (1992).

Tang "Electrostatic comb drive for resonant sensor and actuator applications," Abstract of dissertation at the University of California at Berkeley (1990).

Toledo-Crow et al "Near-field differential scanning optical microscope with atomic force regulation" Appl. Phys. Lett. 60:2957-42959 (1992).

Van Hulst et al "Near-field optical microscope using a silicon-nitride probe" Appl. Phys. Lett. 62:461-463 (1993).

Watson et al "The Radiation Patterns of Dielectric Rods—Experiment Theory" Journal of Applied Physics 19:661-670 (1948).

* cited by examiner

OBJECT INSPECTION AND/OR MODIFICATION SYSTEM AND METHOD

CROSS REFERENCE TO RELATED APPLICATIONS

This application is a continuation of Ser. No. 10/019,009, filed Apr. 26, 2002, now abandoned, which was a U.S. national phase of PCT/US00/18041, filed Jun. 30, 2000, having International Publication No. WO 01/03157 A1, which claims priority from Provisional Application 60/142,178, filed Jul. 1, 1999, all of which are hereby incorporated by reference in their entirety.

This application also incorporates by reference in their entirety the following U.S. applications, U.S. patents, and published PCT applications:

U.S. patent application Ser. No. 09/355,072, filed Jul. 21, 1999, now U.S. Pat. No. 6,337,479;

U.S. patent application Ser. No. 08/885,014, filed Jul. 1, 1997, now U.S. Pat. No. 6,144,028;

U.S. patent application Ser. No. 08/776,361, filed May 16, 1997, now U.S. Pat. No. 6,339,217;

U.S. patent application Ser. No. 08/906,602, filed Dec. 10, 1996, now U.S. Pat. No. 6,265,711;

U.S. patent application Ser. No. 08/506,516, filed Jul. 24, 1995, now U.S. Pat. No. 5,751,683;

U.S. patent application Ser. No. 08/827,953, filed Apr. 6, 1997, now abandoned;

U.S. patent application Ser. No. 08/786,623, filed Jan. 21, 1997, now abandoned;

U.S. patent application Ser. No. 08/613,982, filed Mar. 4, 1996, now U.S. Pat. No. 5,756,997;

U.S. patent application Ser. No. 08/412,380, filed Mar. 29, 1995, now abandoned;

U.S. patent application Ser. No. 08/281,883, filed Jul. 28, 1994, now abandoned;

PCT Patent Application No. PCT/US98/01528, filed Jan. 21, 1999, having International Publication No. WO 98/34092;

PCT Application No. PCT/US96/12255, filed Jul. 24, 1996, having International Publication No. WO 97/04449; and PCT Application No. PCT/US95/09553, filed Jul. 28, 1995, having International Publication No. WO 96/03641.

FIELD OF THE INVENTION

The present invention relates generally to SPM (scanning probe microscopy) and a new application (i.e., branch or subset) of SPM known as nanomachining. In particular, it pertains to a system and method for modifying and/or inspecting an object using new and novel nanomachining and/or other SPM techniques.

BACKGROUND OF THE INVENTION

U.S. Pat. Nos. 5,308,974 and 5,418,363 issued to Elings et al. disclose a method in which a first scan to obtain the topography of a sample surface is used to guide a subsequent second scan for some other task related to the topography. As is standard in SPM applications, this topography represents a simple false surface of the object that is a function (i.e., there is only one z coordinate value for each pair of x,y coordinate values) when in fact the true surface of the object may be a complex surface that is a non-function (i.e. for at least one pair of x,y coordinate values, there is more then one z coordinate value). In other words, the topography is itself a function. The second scan is then performed along the topography, along a fixed (i.e., constant) offset of the topography, or along a function of the topography. However, such an approach is inadequate and inappropriate for use in SPM applications, such as nanomachining and the dynamic measurement of induced parametric change.

In particular, in nanomachining it is the complex desired surface which is the target not the pre-existing topography. Indeed, simple mathematical considerations demonstrate that simply adding or subtracting a fixed amount from an original topography can only reproduce the topography.

Furthermore, in nanomachining and other SPM operations, it is often necessary to perform an operation on an object or a surface or subsurface structure of the object that has a true surface or volume which is not a function. However, such a true surface or volume can never be accurately scanned by a simple offset from the true surface or volume because complex back and forth or in and out motions are required to accurately follow the true surface or volume.

SUMMARY OF THE INVENTION

In summary the present invention is an SPM object inspection and/or modification system 100 which uses new and novel nanomachining and/or other SPM techniques to inspect and/or modify an object. Specifically, it is often desired to perform nanomachining and other SPM operations on an object or a selected surface or subsurface structure of an object.

Thus, in a first mode, an initial inspection of the object is first performed. This may be done by making a first scan of the object with one or more SPM probes. Alternatively, it may be done without doing such a first scan (i.e., without the SPM probes) and using some of the other components of the SPM system instead.

In the case where the initial inspection is made with one or more SPM probes, the first scan is made along the existing surface or volume of the object or the selected structure of the object. Since the existing surface or volume may in fact be a non-function, this scan can be made because the SPM probes can be driven in complex motions, as described earlier. The SPM probes make SPM measurements from which inspection data is generated. This inspection data may represent either an inspected topography (i.e., a simple false surface that is a function), true surface (i.e., complex surface that is a non-function), or volume (i.e., non-function) of the object or the selected structure of the object. Or, it may represent an inspected parametric measurement distribution which may or may not be related to the existing surface or volume of the object or the selected structure. The actual parametric measurement distribution may or may not be a function depending on the corresponding parameter being measured and its distribution. Any non-function surface or volume can be simplified into a topographic representation whether or not the existing surface or volume is a function.

As mentioned earlier, the SPM probes used to make such an inspection include AFM (atomic force microscopy) probes for making AFM measurements, STM (scanning tunneling microscopy) probes for making STM measurements, light emitting and detecting probes for making NSOM (near field optical microscopy), spectrophotometric, and/or other optical measurements, hardness testing probes for hardness measurements, electromagnetic radiation emitting and detecting probes for making electromagnetic radiation measurements, charged particle emitting and detecting probes for making charged particle measurements, electrical probes for making electrical measurements, electric field probes for making electric field measurements, magnetic field probes for making magnetic field measurements, lateral force probes for making lateral force measurements. The inspection can be made with any combination of one or more of these SPM probes.

In the case where the initial inspection is made without doing a first scan using some of the other components of the SPM system, this may be done in such a way that the object is inspected so as to simulate or emulate its use in the environment in which it is normally used. This is done to generate the inspection data.

After the initial inspection is made, an SPM operation is performed by making a second scan of the object based on the inspection data. This SPM operation may be another inspection of the object or a modification of the object by nanomachining. This may be done with the same SPM probe used in the first scan and/or with one or more other SPM probes. Furthermore, this operation may be performed directly based on the inspection data or it may be performed based on guide data generated from the inspection data.

In the case where the SPM operation is performed directly based on the inspection data, the second scan is made along the actual topography, actual true surface, actual volume, or actual parametric measurement distribution (such as magnetic field, electric field, temperature, or other measurement distribution) represented by the target data represented by the inspection data. Since the actual true surface, actual volume, or actual parametric measurement distribution may be a non-function, the second scan can be made because the SPM probes can be driven in complex motions, as described earlier.

In the case where the SPM operation is performed based on guide data generated from the inspection data, the guide data may be generated by comparing the inspection data with target data representing a target topography, true surface, volume, or parametric measurement distribution. For example, if the target data and the inspection data do not match within a predefined tolerance level stored by the controller and specified by the user with the user interface 116, the controller generates guide data for guiding the performance of a modification that needs to be made to the object to fall within the tolerance level. Furthermore, the guide data may represent a complex motion, such as a guide topography, true surface, volume, or parametric measurement distribution that is related to the actual and target topographies, true surfaces, volumes, or parametric measurement distributions. Since the actual and target true surfaces, volumes, or parametric measurement distributions may be non-functions, the complex motion may itself be a non-function. The second scan is made along the loci of this complex motion to perform the SPM operation. Again, the second scan can be made because the SPM probes can be driven in complex motions, as described earlier.

In the case where the SPM operation is a modification to the object, the process just described can be iteratively repeated until the generated inspection data converges to the target data so as to be within the predefined tolerance level. As will be discussed later, this mode is particularly useful in fabrication and/or repair of semiconductor wafers and fabrication masks, lithographic structures, thin film magnetic read/write heads, and SPM probes. It is also useful in direct manipulation of DNA, RNA and other biochemical elements and chemical catalysts.

In a second mode, the inspection data generated from the initial inspection may be used to simply locate and identify a reference point on the existing surface or volume of the object or structure of the object. This may be done by comparing the inspection data with target data for the object. Then, pre-defined or pre-generated guide data received from an external system to the SPM system is used for performing the SPM operation made with the second scan. This guide data is not generated from or based on the inspection data and may represent a complex motion, such as a guide topography, true surface, volume, or parametric measurement distribution. Then, the first mode of the SPM system may be used to further inspect and/or modify the object. This second mode is useful in fabrication and/or repair of semiconductor wafers and fabrication masks, lithographic structures, thin film magnetic read/write heads, and SPM probes where the type of object is already known and the desired inspection or modification is already known or pre-defined.

In a third mode, an initial inspection is not even made. Instead, using well known techniques, an SPM probe is brought into contact or a known near contact with the existing surface or volume of the object or the structure of the object. In doing so, inspection data is not generated. Then, the pre-defined or pre-generated guide data received from an external system to the SPM system is used for the scan in which the SPM operation is performed. In doing, so the scan is made along the guide topography, true surface, volume, or parametric measurement distribution represented by the guide data. Once again, the first mode of the SPM system may then be used to further inspect and/or modify the object. As with the second mode, this third mode is useful in fabrication and/or repair of semiconductor wafers and fabrication masks, lithographic structures, thin film magnetic read/write heads, and SPM probes where the type of object is already known and the desired inspection or modification is already known or pre-defined.

Moreover, in some cases the inspection data used to generate guide data need only represent the boundaries of the surface or volume of the object or the selected structure of the object. For example, the initial inspection data from an initial inspection by the SPM system 100 or from an external system to the SPM system may be analyzed by the controller to locate the guide surface or volume on which a selected structure of the object lies. This guide surface or volume is represented by initial guide data. Then, a first scan is made according to the initial guide data to generate additional inspection data representing the boundary of the structure on the guide surface or volume. In doing so, only the x,y coordinates of the points defining the boundary are recorded and stored. Then, by comparing this additional inspection data with the target data, additional guide data is generated. Then, the first mode of the SPM system may be used to further inspect and/or modify the object. This second mode is also useful in fabrication and/or repair of semiconductor wafers and fabrication masks, lithographic structures, thin film magnetic read/write heads, and SPM probes where the type of object.

In some cases, the inspection data used to generate guide data need only represent the boundaries of a sample topography, true surface, volume, or parametric measurement distribution of the object or a selected structure of the object. For example, the inspection data from an initial inspection by the SPM system or from an external system to the SPM system may be analyzed by the controller to locate a guide topography, true surface, or volume on which a selected structure of the object lies or locate a sample parametric measurement distribution of the object. In response, the controller generates first guide data representing this guide topography, true surface, volume, or parametric measurement distribution.

Then, a first scan is made according to this first guide data and with respect to the guide topography, true surface, volume, or parametric measurement distribution to generate inspection data representing the boundary of the structure on the guide topography, true surface, volume, or parametric measurement distribution. In doing so, only the x,y coordinates of the points defining the boundary are recorded and stored. The points within the boundary are identified during the first scan when they substantially deviate from the corresponding point of the guide topography, true surface, volume, or parametric measurement distribution represented by the inspection data. These points are not recorded and stored.

Alternatively, the first scan is made according to the first guide data and with respect to the guide topography, true surface, volume, or parametric measurement distribution to generate inspection data representing a non-conforming (i.e., deviating) boundary of the guide topography, true surface, volume or parametric measurement distribution. In this case, the points within the non-conforming boundary are identified during the first scan when they substantially deviate from the corresponding point of the target topography, true surface, volume, or parametric measurement distribution represented by the target data. Thus, only the x,y coordinates of the points defining the non-conforming boundary are recorded and stored.

Then, the SPM operation is performed by making a second scan of the object based on the inspection data. As alluded to earlier, this may be done directly based on the inspection or guide data generated by comparing the inspection data to the target data. Then, the first mode of the SPM system may be used to further inspect and/or modify the object. This second mode is also useful in fabrication and/or repair of semiconductor wafers and fabrication masks, lithographic structures, thin film magnetic read/write heads, and SPM probes where the type of object.

DETAILED DESCRIPTION OF THE INVENTION

Figure 1:
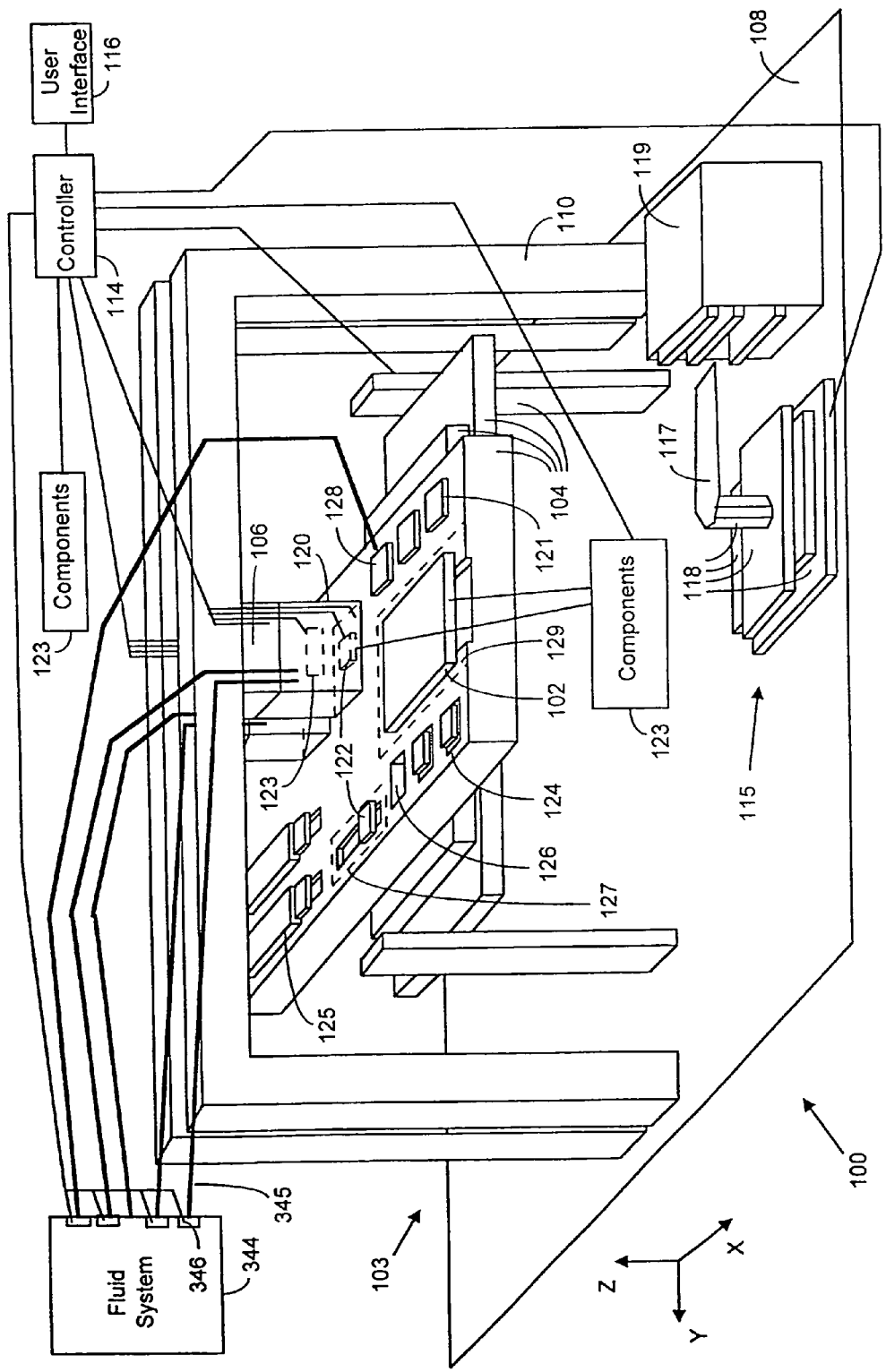
FIG. 1 shows an SPM inspection and/or modification system for inspecting and/or modifying an object.

Referring to FIG. 1, there is shown an exemplary embodiment of an SPM (scanning probe microscopy) object inspection and/or modification system 100 which uses new and novel nanomachining and/or other SPM techniques to inspect and/or modify an object 102. For example, as will be discussed throughout this document, the system can be used to perform tests, fabrication (i.e., manufacturing) steps, and/or repairs on semiconductor wafers and fabrication masks, lithographic structures (i.e., masters), and thin film magnetic read/write heads. Additionally, as will also be discussed throughout this document, the SPM system can also be used to analyze and/or alter biological or chemical samples.

The components of the SPM system 100 include a positioning system 103 that comprises a rough positioning subsystem 104, fine positioning subsystems 106, a support table 108, and scanning head support structures 110. The rough positioning subsystem 104 comprises a rough 3-D (i.e., three dimensions) translator, such as a mechanical ball screw mechanism. The rough positioning subsystem 104 is fixed to the support table 108. Each fine positioning subsystem 106 comprises a fine 3-D translator, such as a piezoelectric translator with or without linear position feedback. Each fine positioning subsystem 106 is fixed to a corresponding scanning head support structure 110. Each scanning support structure 110 is fixed to the support table 108.

The components of the SPM system 100 also include one or more scanning heads 120. Each scanning head 120 is fixed to a corresponding fine positioning subsystem 106 and is roughly and finely positioned in 3-D (i.e., X, Y, and Z dimensions) with the rough positioning subsystem 104 and the corresponding fine positioning subsystem 106. This positioning may be done in order to load and unload various types of SPM probes 122 of the SPM system to and from the scanning heads 120 and position the loaded SPM probes 122 for calibration and inspection and/or modification of the object 102. This positioning is done with respect to the object 102, calibration structures 128, probe suppliers 124 and 125, a probe disposal 126, a probe storage site 127, and other components 123 of the SPM system.

The components of the SPM system 100 also include a programmed controller 114 that includes a user interface 116. It also includes an object loader 115 that comprises a load arm 117, a positioning system 118 connected to the load arm 117, and an object storage unit 119. When it is desired to inspect and/or modify the object 102, a user of the SPM system 100 uses the user interface 116 to request that the controller 114 have the object 102 loaded by the object loader 115 for inspection and/or modification. The controller 114 controls the load arm 117 and the positioning system 103 so as to load the object 102 from the storage unit 119 onto the support stage (or object loading site) 129. The support stage 129 is also one of the SPM system 100's components and is located on the upper surface of the rough positioning subsystem 104. In loading the object 102 onto the support stage 129, the object 102 is removed from the storage unit 119 with the load arm 117. The load arm 117 is then lowered into a recess of the support stage 129 so that the object 102 rests on the support stage 129 and no longer on the load arm 117. The load arm 117 is then slid out of the recess. Similarly, when the inspection and/or modification of the object 102 is over, the user requests with the user interface 116 that the controller 114 have the object 102 unloaded. In response, the controller 114 controls the load arm 117 to unload the object 102 from the support stage 129 and place it back in the storage unit 119. This is done by sliding the load arm 117 into the recess and raising it so that the object 102 rests on the load arm 117 and no longer on the support stage 129. The load arm 117 is then used to place the object 102 back in the storage unit 119. The object loader 115 may be a conventional semiconductor wafer or fabrication mask loader used in fabrication of wafers or masks.

As alluded to earlier, the components of the SPM system 100 further include SPM probes 122, vertical and horizontal probe suppliers 124 and 125, and a probe storage site 127. The SPM probes 122 can be loaded onto each scanning head 120 from the vertical and horizontal probe suppliers 124 and 125 or from the probe storage site 127. The probe storage site 127 and the probe suppliers 124 and 125 are located on the rough positioning subsystem 104. Each probe supplier 124 and 125 may supply a different type of SPM probe 122 than any other probe suppliers 124 and 125 and comprises a stacking mechanism for stacking the same type of SPM probe 122. This may be a spring, air, gravity, electromechanical, or vacuum driven stacking mechanism.

Moreover, when the user wishes to use a particular SPM probe 122 for inspecting and/or modifying the object 102, the user instructs the controller 114 with the user interface 116 to load this SPM probe 122 onto one of the scanning heads 120. If an SPM probe 122 of this type has already been used before and has been stored at the probe storage site 127, the controller 114 controls the positioning system 103 to position the scanning head 120 over this site and lower it onto the SPM probe 122. The controller 114 then controls the scanning head 120 so that the SPM probe 122 is loaded onto it. But, if a new SPM probe 122 of this type is required because one has not been used or the previously used one has become defective, the controller 114 controls the positioning system 103 to position the scanning head 120 over the probe supplier 124 or 125 that supplies the desired type of SPM probe 122 and lower it onto the SPM probe 122 that is currently at the top of the stack of the probe supplier 124 or 125. The controller 114 then causes the SPM probe 122 to be popped off of the stack and loaded onto the scanning head 120. In addition, in the instances described in PCT Patent Application No. PCT/US98/01528 referenced earlier where active mechanical, electrical, electromagnetic, vacuum, hydraulic, pneumatic, fluids, magnetic, or other mechanisms are integrated into the SPM probe 122, provision is made on the SPM probe 122 and in the scanning head 120 for control connections (i.e., electrical, optical, mechanical, vacuum, etc.). As a result, the scanning head may sense optical, mechanical or electrical variations which tell the controller 114 which type of SPM probe 122 has been loaded. Thus, different types of SPM probes 122 may be loaded through the same probe supplier 124 or 125. The different types of SPM probes 122 and probe suppliers 124 an 125 and the specific ways in which the SPM probes 122 may be loaded onto the scanning heads 120 is discussed in PCT Patent Application No. PCT/US98/01528 referenced earlier.

However, when the user wishes to use another one of the SPM probes 122 for inspecting and/or modifying the object 102 with the same scanning head 120, the user instructs the controller 114 with the user interface 116 to unload the currently loaded SPM probe 122. In response, the controller 114 controls the positioning system 103 to position the scanning head 120 so that the SPM probe 122 that is currently loaded is lowered to the probe storage site 127 on the rough positioning subsystem 104. Then, the controller causes the SPM probe 122 to be unloaded from the scanning head 120 onto this probe storage site 127.

In order to calibrate an SPM probe 122 that is loaded onto one of the scanning heads 120 and determine whether it is defective, the components of the SPM system 100 include calibration structures 128 located on the rough positioning subsystem 104. An SPM probe 122 may be defective because of wear or because of fabrication errors. For each type of SPM probe 122, the controller 114 stores one or more reference parameters each associated with a corresponding calibration structure 128. The controller 114 controls the positioning system 103, the SPM probe 122, and some of the other components 123 of the SPM system 100 so that various types of reference measurements of the calibration structure 128 are made with the SPM probe 122 or vice versa. These reference measurements are then compared with the reference parameters. If they do not match within a predefined tolerance level stored by the controller 114 and set by the user with the user interface 116, then the SPM probe 122 is considered to be defective. Otherwise, the controller 114 uses the reference measurements to calibrate the SPM probe 122 in the ways described in PCT Patent Application No. PCT/US98/01528 referenced earlier. Furthermore, the specific types of calibrations that can be made for the SPM probes 122 are also described in PCT Patent Application No. PCT/US98/01528 referenced earlier.

In addition, the components of the SPM system 100 may include one or more tip nanomachining structures 121. At the nanomachining structures 121, material of the tips of the SPM probes 122 may be nanomachined by abrasively lapped and/or chemically lapped off. This is done by rubbing the material of the tips against the tip nanomachining structures 121.

The components of the SPM system 100 also include a probe disposal 126 which is used to dispose of (or discard) SPM probes 122 that are defective. In the case of an SPM probe 122 that is determined to be defective in the manner just described, the user can instruct the controller 114 with the user interface 116 to have the defective SPM probe 122 discarded. In response, the controller 114 controls the positioning system 103 to position the scanning head 120 over the probe disposal 126 and lower it to the probe disposal 126. Then, the controller 114 controls the scanning head 120 to unload the currently loaded SPM probe 122 into the probe disposal 126.

In an alternative embodiment, each scanning head 120 could be fixed to a corresponding rough positioning subsystem 104 and a corresponding fine positioning subsystem 106. The probe suppliers 124 and 125, probe disposal 126, and the calibration structures 128 would then be located on the support table 108. In this way, each scanning head 120 could be independently positioned with respect to the probe suppliers 124 and 125 and probe disposal 126 for loading, unloading, and disposal of the SPM probes 122 and independently positioned for positioning an SPM probe 122 with respect to the object 102 for inspection and/or modification of the object 102 and with respect to the reference structures 128 for calibration and examination of the SPM probes 122. Moreover, in such an embodiment, there would be a corresponding scanning head 120, a corresponding rough positioning subsystem 104, and a corresponding fine positioning subsystem 106 for inspection and for modification.

The SPM probes 122 include probes with which the object 102 may be inspected in a number of ways using SPM techniques to make SPM measurements. The SPM probes used to make such an inspection include AFM (atomic force microscopy) probes for making AFM measurements, STM (scanning tunneling microscopy) probes for making STM measurements, light emitting and detecting probes for making NSOM (near field scanning optical microscopy), spectrophotometric, and/or other optical measurements, hardness testing probes for hardness measurements, electromagnetic radiation emitting and detecting probes for making electromagnetic radiation measurements, charged particle emitting and detecting probes for making charged particle measurements, electrical probes for making electrical measurements, electric field probes for making electric field measurements, magnetic field probes for making magnetic field measurements, lateral force probes for making lateral force measurements, chemical probes for making chemical combination or bond strength measurements. The various types of SPM probes used to inspect the object and the corresponding kinds of inspections they are used to make include those described in PCT Patent Application Nos. PCT/US98/01528, PCT/US96/12255, and PCT/US95/09553 referenced earlier.

The inspection is performed with various components of the SPM system including the controller 114, the user interface 116, the positioning system 103, the scanning heads 120, those of the calibration structures 128 used to calibrate the SPM probes 122, and those of the other components 123 of the SPM system 100 that are used for making SPM measurements with the SPM probes 122. In doing so, the user requests that an inspection be made with the user interface 116. As discussed later, this inspection may be done based on inspection data or guide data generated by the SPM system 100 or an external system to the SPM system 100. When this occurs, one or more of the SPM probes 122 are selectively loaded, calibrated, and unloaded in the manner discussed earlier for making SPM measurements of the object 102. Moreover, for each SPM probe 122 that is used to make certain SPM measurements of the object 102, the controller 114 controls the positioning system 103, any of the other components of the SPM system used to make these SPM measurements, and the loaded SPM probe 122 so that these SPM measurements are made with the SPM probe 122. The controller 114 then processes all of the SPM measurements and generates inspection data (or results) for the object. This inspection data may represent the topography of a volume or surface of the object 102 or a surface or subsurface structure of the object 102. Or, it may represent a parametric measurement distribution related to the volume or surface of the object 102 or a surface or subsurface structure of the object 102. It may also include an image and/or analysis of the object. The analysis may be of the electrical, optical, chemical, (including catalytic), and/or biological (including morphological) properties, operation, and/or characteristics of the object.

Although it may be desired to simply inspect the object 102, certain components of the SPM system 100 are used to make a modification to the object 102. The SPM probes 122 also include SPM probes 122 with which the modification may be made in a number of ways. This modification may be simply to remove particle contaminants on the object or more importantly to structurally and/or chemically modify the material of the object by removing, deforming, and/or chemically changing a portion of it or adding other material to it. The SPM probes used to make such a modification include SPM probes for nanomachining the object 102 by making cuts in the object 102, milling the object 102, vacuum arc deposition or removal of material on or from the object 102, pumping fluid material to or from the object 102, irradiating the object 102 with charged particles, heating the object 102, and chemically modifying the object 102. These SPM probes 122 and the corresponding kinds of modifications that can be made with them are further described in PCT Patent Application Nos. PCT/US98/01528, PCT/US96/12255, and PCT/US95/09553 referenced earlier. Furthermore, some of these SPM probes 122 may also be used to inspect the object as also discussed in PCT Patent Application Nos. PCT/US98/01528, PCT/US96/12255, and PCT/US95/0955.

The components of the SPM system 100 used for this purpose include the controller 114, the user interface 116, the positioning system 103, the scanning heads 120, those of the calibration structures 128 used to calibrate the SPM probes 122, and those of the other components 123 of the SPM system that are used in making modifications to the object 102 with the SPM probes 122. With the user interface 116, the user requests that a modification be made to the object 102. As discussed later, this modification may be performed based on inspection data or guide data generated by the SPM system 100 or based on inspection data or guide data generated by an external inspection system to the SPM system 100. Then, one or more of the SPM probes 122 are selectively loaded, calibrated, and unloaded in the manner described earlier to make the desired modification. Furthermore, for each SPM probe 122 used to make a desired modification to the object, the controller 114 controls the positioning system 103, any of the other components of the SPM system 100 used in making this modification, and, if needed, the SPM probe 122 so that this modification is made.

Controlling Positioning System to Create Complex Motion

The controller 114 controls the operation of the positioning system 103 shown in FIG. 1. In doing so, the controller 114 can individually drive the X, Y, and Z piezoelectric drives of the rough positioning subsystem 104 and can individually drive the X, Y, and Z piezoelectric drives of each fine positioning subsystem 106.

In order to perform the SPM measurements of the kind described earlier, the controller 114 can control the positioning of the SPM probes 122 that are used to make SPM measurements in the conventional way. This involves moving such an SPM probe 122 from scan point to scan point with respect to the object 102 by only driving the positioning system 103 in one of the X, Y, and Z dimensions at a time during the scan. Specifically, in order to position the tip of such an SPM probe 122, the positioning system 103 is driven in only the X dimension or only in the Y dimension in order to move from one scan point to another scan point. Moreover, the positioning system 103 is not driven in the Z dimension simultaneously while it is driven in the X or Y dimension. Instead, the positioning system 103 is under the servo (i.e., feedback) control of the controller 114 in the Z dimension. As a result, positioning of such a probe in the Z dimension is done separately at each scan point. This is typically done in order to prevent the tip of the SPM probe 122 from crashing into the object 102.

However, the controller 114 can also control the positioning of the SPM probes 122 that are used to make SPM measurements in a non-conventional way. Specifically, the controller 114 controls positioning of such an SPM probe 122 by moving it with respect to the object 102 by driving the positioning system 103 in all three of the X, Y, and Z dimensions simultaneously to perform the SPM measurements. Thus, the tip of such an SPM probe 122 can be moved in a series of 3-D (three dimensional) vectors to pass through the loci (i.e., points with X, Y, and Z coordinate values) of a selected complex motion. The selected complex motion formed with this series of 3-D vectors may define a larger 3-D vector, arc, curve, surface, or volume and may not be a function. As a result, the SPM probe 122 can be moved with such a complex motion in and out of and up and down along the surface or volume of the object 102 or a subsurface or surface structure of the object 102 to make the SPM measurements. In view of the foregoing, this surface or volume may in fact not be a function.

As mentioned earlier, the SPM system includes SPM probes for making modifications to the object 102 by nanomachining the object 102. For example, the object may be nanomachined by making cuts in or milling the object 102. The controller 114 controls positioning of such an SPM probe 122 in a complex motion in a similar manner to that just discussed by driving the positioning system 103 in all three of the X, Y, and Z dimensions simultaneously to perform the nanomachining operation. This means that the tip of such an SPM probe 122 can also be moved in a series of 3-D (three dimensional) vectors to pass through the loci of the selected complex motion. Thus, the complex motion of the tip of such an SPM probe can be a series of 3-D vectors defining a larger 3-D vector, arc, curve, surface, or volume. As a result, the tip of the SPM probe 122 can be moved along a selected complex motion that is not even a function to make the modification.

This process is also applicable to performing the sweeping motions described earlier. In this way, 2-D or 3-D sweeping motions can be performed for sweeping away debris particles that are caused by modifications made with the SPM probes 122.

Inspection and/or Modification Modes

It is often desired to perform nanomachining and other SPM operations on an object or a selected surface or subsurface structure of an object 102. In a first mode of the SPM system 100, an initial inspection of the object 102 is first performed. This may be done by making a first scan of the object 102 with one or more of the SPM probes 122. Alternatively, it may be done without doing such a first scan (i.e., without the SPM probes 122) and using some of the other components 123 of the SPM system 100 instead.

In the case where the initial inspection is made with one or more SPM probes, the first scan is made along the existing surface or volume of the object 102 or the selected structure of the object 102. Since the existing surface or volume may in fact be a non-function, this scan can be made because the SPM probes can be driven in complex motions, as described earlier. The SPM probes make SPM measurements from which inspection data is generated. This inspection data may represent either an inspected topography (i.e., a simple false surface that is a function), true surface (i.e., complex surface that is a non-function), or volume (i.e., non-function) of the object 102 or the selected structure of the object 102. Or, it may represent an inspected parametric measurement distribution which may or may not be related to the existing surface or volume of the object 102 or the selected structure. The actual parametric measurement distribution may or may not be a function depending on the corresponding parameter being measured and its distribution. Any non-function surface or volume can be simplified into a topographic representation whether or not the existing surface or volume is a function.

As mentioned earlier, the SPM probes 122 used to make such an inspection include AFM (atomic force microscopy) probes for making AFM measurements, STM (scanning tunneling microscopy) probes for making STM measurements, light emitting and detecting probes for making NSOM (near field optical microscopy), spectrophotometric, and/or other optical measurements, hardness testing probes for hardness measurements, electromagnetic radiation emitting and detecting probes for making electromagnetic radiation measurements, charged particle emitting and detecting probes for making charged particle measurements, electrical probes for making electrical measurements, electric field probes for making electric field measurements, magnetic field probes for making magnetic field measurements, lateral force probes for making lateral force measurements. The inspection can be made with any combination of one or more of these SPM probes 122.

In the case where the initial inspection is made without doing a first scan using some of the other components 123 of the SPM system 100, such an inspection may be made in the manner described in PCT Patent Application Nos. PCT/US98/01528, PCT/US96/12255, and PCT/US95/0955 referenced earlier. For example, this may be done in such a way that the object 102 is inspected so as to simulate or emulate its use in the environment in which it is normally used to generate the inspection data.

After the initial inspection is made, an SPM operation is performed by making a second scan of the object 102 based on the inspection data. This SPM operation may be another inspection of the object 102 or a modification of the object 102 by nanomachining. This may be done with the same SPM probe 122 used in the first scan and/or with one or more other SPM probes 122. Furthermore, this operation may be performed directly based on the inspection data or it may be performed based on guide data generated from the inspection data.

In the case where the SPM operation is performed directly based on the inspection data, the second scan is made along the actual topography, actual true surface, actual volume, or actual parametric measurement distribution (such as magnetic field, electric field, temperature, or other measurement distribution) represented by the target data represented by the inspection data. Since the actual true surface, actual volume, or actual parametric measurement distribution may be a non-function, the second scan can be made because the SPM probes can be driven in complex motions, as described earlier.

In the case where the SPM operation is performed based on guide data generated from the inspection data, the guide data may be generated by comparing the inspection data with target data representing a target topography, true surface, volume, or parametric measurement distribution. For example, if the target data and the inspection data do not match within a predefined tolerance level stored by the controller 114 and specified by the user with the user interface 116, the controller 114 generates guide data for guiding the performance of a modification that needs to be made to the object 102 to fall within the tolerance level. Furthermore, the guide data may represent a complex motion, such as a guide topography, true surface, volume, or parametric measurement distribution that is related to the actual and target topographies, true surfaces, volumes, or parametric measurement distributions. Since the actual and target true surfaces, volumes, or parametric measurement distributions may be non-functions, the complex motion may itself be a non-function. The second scan is made along the loci of this complex motion to perform the SPM operation. Again, the second scan can be made because the SPM probes can be driven in complex motions, as described earlier.

In the case where the SPM operation is a modification to the object 102, the process just described can be iteratively repeated until the generated inspection data converges to the target data so as to be within the predefined tolerance level. As will be discussed later, this mode is particularly useful in fabrication and/or repair of semiconductor wafers and fabrication masks, lithographic structures, thin film magnetic read/write heads, and SPM probes. It is also useful in direct manipulation of DNA, RNA and other biochemical elements and chemical catalysts.

In a second mode, the inspection data generated from the initial inspection may be used to simply locate and identify a reference point on the existing surface or volume of the object 102 or structure of the object 102. This may be done by comparing the inspection data with target data for the object 102. Then, pre-defined or pre-generated guide data received from an external system to the SPM system 100 is used for performing the SPM operation made with the second scan. This guide data is not generated from or based on the inspection data and may represent a complex motion, such as a guide topography, true surface, volume, or parametric measurement distribution. For example, the complex motion may be a previously calculated shape or loci, such as the shape of a particular feature on a semiconductor mask derived from an electronic database of shapes and positions corresponding to a desired guide mask, which describes the cut motion of the tip of the SPM probe 122. The reference point in this case may be some local structure. Then, the first mode of the SPM system 100 may be used to further inspect and/or modify the object 102. This second mode is useful in fabrication and/or repair of semiconductor wafers and fabrication masks, lithographic structures, thin film magnetic read/write heads, and SPM probes where the type of object 102 is already known and the desired inspection or modification is already known or pre-defined.

In a third mode, an initial inspection is not even made. Instead, using well known techniques, an SPM probe is brought into contact or a known near contact with the existing surface or volume of the object 102 or the structure of the object 102. In doing so, inspection data is not generated. Then, the pre-defined or pre-generated guide data received from an external system to the SPM system 100 is used for the scan in which the SPM operation is performed. In doing, so the scan is made along the guide topography, true surface, volume, or parametric measurement distribution represented by the guide data. Once again, the first mode of the SPM system 100 may then be used to further inspect and/or modify the object 102. As with the second mode, this third mode is useful in fabrication and/or repair of semiconductor wafers and fabrication masks, lithographic structures, thin film magnetic read/write heads, and SPM probes where the type of object 102 is already known and the desired inspection or modification is already known or pre-defined.

Moreover, in some cases the inspection data used to generate guide data need only represent the boundaries of the surface or volume of the object 102 or the selected structure of the object 102. For example, the initial inspection data from an initial inspection by the SPM system 100 or from an external system to the SPM system 100 may be analyzed by the controller 114 to locate the guide surface or volume on which a selected structure of the object 102 lies. This guide surface or volume is represented by initial guide data. Then, a first scan is made according to the initial guide data to generate additional inspection data representing the boundary of the structure on the guide surface or volume. In doing so, only the x,y coordinates of the points defining the boundary are recorded and stored. Then, by comparing this additional inspection data with the target data, additional guide data is generated. Then, the first mode of the SPM system 100 may be used to further inspect and/or modify the object 102. This second mode is also useful in fabrication and/or repair of semiconductor wafers and fabrication masks, lithographic structures, thin film magnetic read/write heads, and SPM probes where the type of object 102.

In some cases, the inspection data used to generate guide data need only represent the boundaries of a sample topography, true surface, volume, or parametric measurement distribution of the object 102 or a selected structure of the object 102. For example, the inspection data from an initial inspection by the SPM system 100 or from an external system to the SPM system 100 may be analyzed by the controller 114 to locate a guide topography, true surface, or volume on which a selected structure of the object 102 lies or locate a sample parametric measurement distribution of the object 102. In response, the controller 114 generates first guide data representing this guide topography, true surface, volume, or parametric measurement distribution.

Then, a first scan is made according to this first guide data and with respect to the guide topography, true surface, volume, or parametric measurement distribution to generate inspection data representing the boundary of the structure on the guide topography, true surface, volume, or parametric measurement distribution. In doing so, only the x,y coordinates of the points defining the boundary are recorded and stored. The points within the boundary are identified during the first scan when they substantially deviate from the corresponding point of the guide topography, true surface, volume, or parametric measurement distribution represented by the inspection data. These points are not recorded and stored.

For example, in nanomachining of a semiconductor mask, in some cases it is desirable to inspect the surface in the general area to be nanomachined so as to determine the orientation of the plane which is coplanar with the glass or quartz substrate on which the Chrome of the mask lies. As mentioned earlier, the inspection data representing this surface may be generated by the SPM system 100 or by an external system to the SPM system 100. The inspection data is then analyzed to determine this plane. Then, inspection data representing the boundary (i.e., the x,y coordinates) of the initial distribution of Chrome with respect to this plane is generated in the manner just discussed. Then, based on this inspection data and the target data representing the desired distribution of Chrome, a guide data set is generated for removing the excess Chrome.

Alternatively, the first scan is made according to the first guide data and with respect to the guide topography, true surface, volume, or parametric measurement distribution to generate inspection data representing a non-conforming (i.e., deviating) boundary of the guide topography, true surface, volume or parametric measurement distribution. In this case, the points within the non-conforming boundary are identified during the first scan when they substantially deviate from the corresponding point of the target topography, true surface, volume, or parametric measurement distribution represented by the target data. Thus, only the x,y coordinates of the points defining the non-conforming boundary are recorded and stored.

Figure 9:
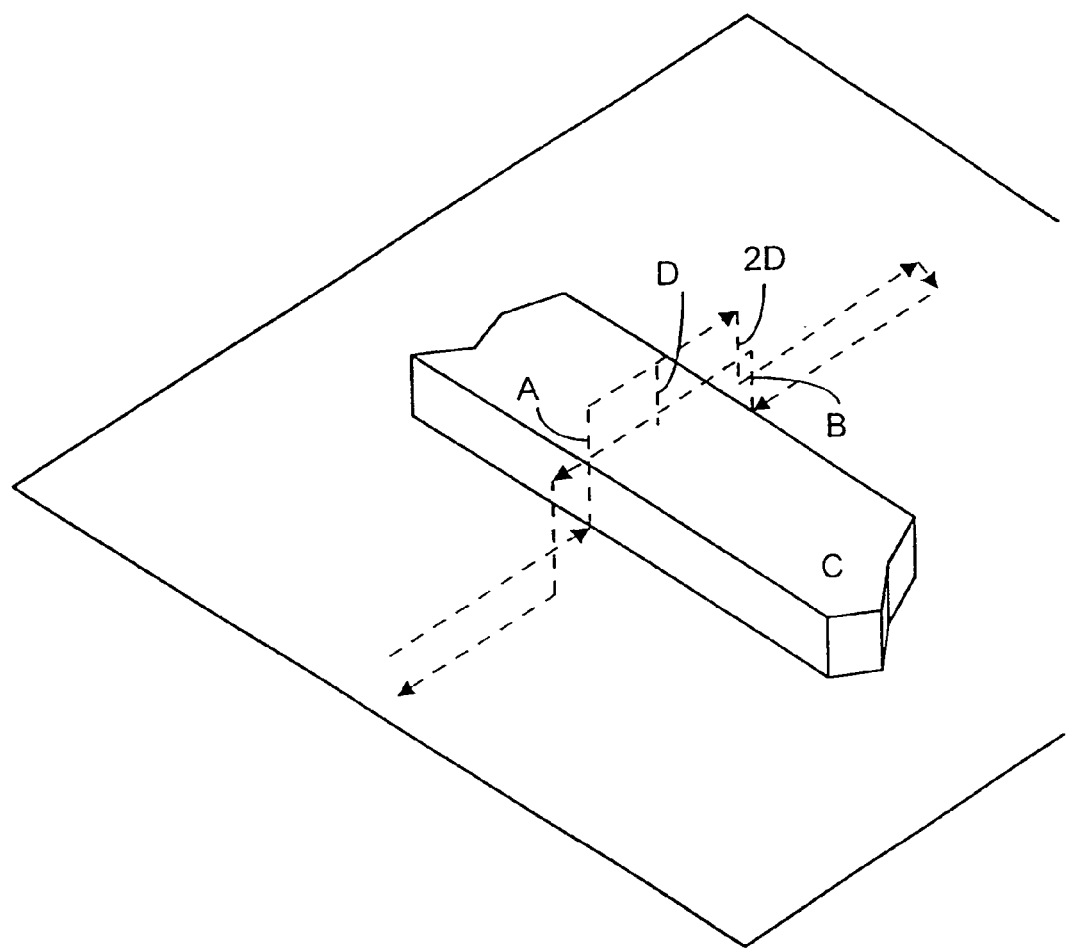
FIGS. 9 to 11 show even more views of the SPM probe of the SPM system of FIG. 1.

Referring to FIG. 9, in both cases, the controller 114 causes the first scan to be made at scan points along a selected direction. The controller 114 discontinues the first scan when a point A of one edge of the topographic, true surface, volume, or parametric boundary is reached. In other words, when a deviation occurs at point A. The controller 114 then resumes the scan when a pre-defined skip distance D is reached. This skip distance D is pre-defined based on the type of inspection being made. If there is no deviation at this scan point, then the controller 114 continues the scan in the selected direction. However, if there is still a deviation at this scan point, then the controller 114 discontinues the first scan for another skip distance D and the temporary total skip distance 2D is added and stored. This process is repeated until no deviation occurs (i.e., the guide topography, surface, volume, or parametric measurement distribution is reached). A corresponding return motion is used to determine the point B of the other edge of the topographic, true surface, volume, or parametric boundary. Once this opposite edge is found, the temporary total skip value 2D is used to fly to or past the original edge A of the boundary before the scan is continued.

In this way, the first scan has exactly bracketed the surface, volumetric, or parametric boundary for further use or measurement. This reduces the data requirement for measurement or modification of the object 102 and substantially decreases the scan time of the first scan.

Then, the SPM operation is performed by making a second scan of the object 102 based on the inspection data. As alluded to earlier, this may be done directly based on the inspection or guide data generated by comparing the inspection data to the target data. Then, the first mode of the SPM system 100 may be used to further inspect and/or modify the object 102. This second mode is also useful in fabrication and/or repair of semiconductor wafers and fabrication masks, lithographic structures, thin film magnetic read/write heads, and SPM probes where the type of object 102.

SPM Probe 122 and Housing 120 Configuration

Figure 2:
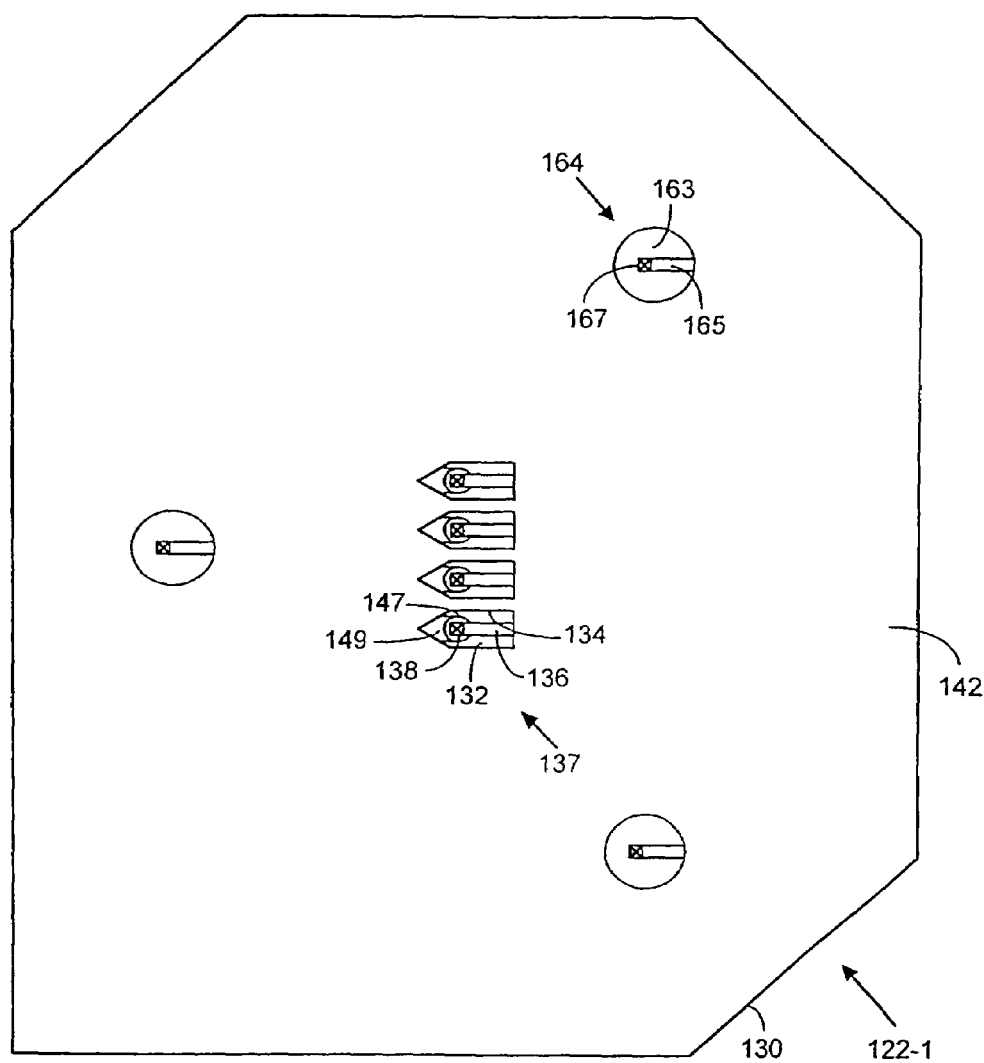
FIGS. 2 to 4 show different views of an SPM probe of the SPM system of FIG. 1.

Referring now to FIG. 2, there is shown one type of SPM probe 122 for use in inspecting and/or modifying the object 102. This particular SPM probe 122 may be used to make SPM measurements of the object 102, such as AFM, STM, NSOM, spectrophotometric, and/or other optical measurements, and/or it may be used to make modifications to the object 102 by making cuts in the object 102. This SPM probe 122 is of the type disclosed in PCT Patent Application Nos. PCT/US98/01528, PCT/US96/12255, and PCT/US95/0955 referenced earlier.

The SPM probe 122 has a base 130 and apertures (or openings) 132 that define corresponding inner perimeter surfaces 134 of the base. The probe also has several cantilevers 136 each connected to the base and extending into a corresponding aperture. On each cantilever is a corresponding tip 138. Each cantilever and corresponding tip form a corresponding SPM tool 137 that is used in making the SPM measurements and/or cuts (i.e., modifications). This SPM tool 137 is attached to the base, disposed in the corresponding aperture, and framed (or surrounded) by the corresponding inner surface of the base.

Figure 3:
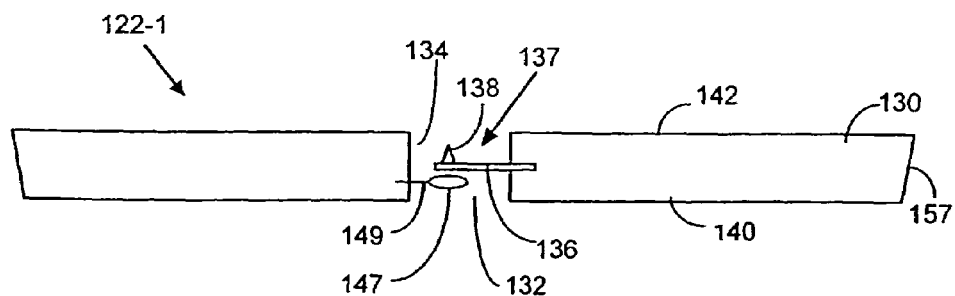

As shown in FIG. 3, when not engaged for inspecting and/or modifying the object 102, each SPM tool 137 of the SPM probe 122 is normally kept in the corresponding aperture 132 between the upper and lower surfaces 140 and 142 of the base 130 so that the tool, and in particular the tip 138, is protected from being damaged during loading onto and unloading from one of the scanning heads 120. Moreover, referring to FIG. 1, the probe may be supplied by one of the probe suppliers 124 that has a vertical stacking mechanism and extends vertically up through the rough positioning subsystem 104. In such a probe supplier, the probe can be vertically stacked on top of other probes of this type without damaging the tools of the probe.

Furthermore, referring to FIG. 3, each tool 137 of the probe 122 can be used to make NSOM, spectrophotometric, and/or other optical measurements in order to inspect the object 102. Thus, for each tool of the probe, the probe includes a corresponding lens 147 and lens support 149 that supports the lens. As with the tip and cantilever of each tool, the lens and lens support for each tool may be integrally formed together with the base 130 or the base may be formed on and around the lens support. This is also done using conventional semiconductor manufacturing techniques.

Figure 4A:
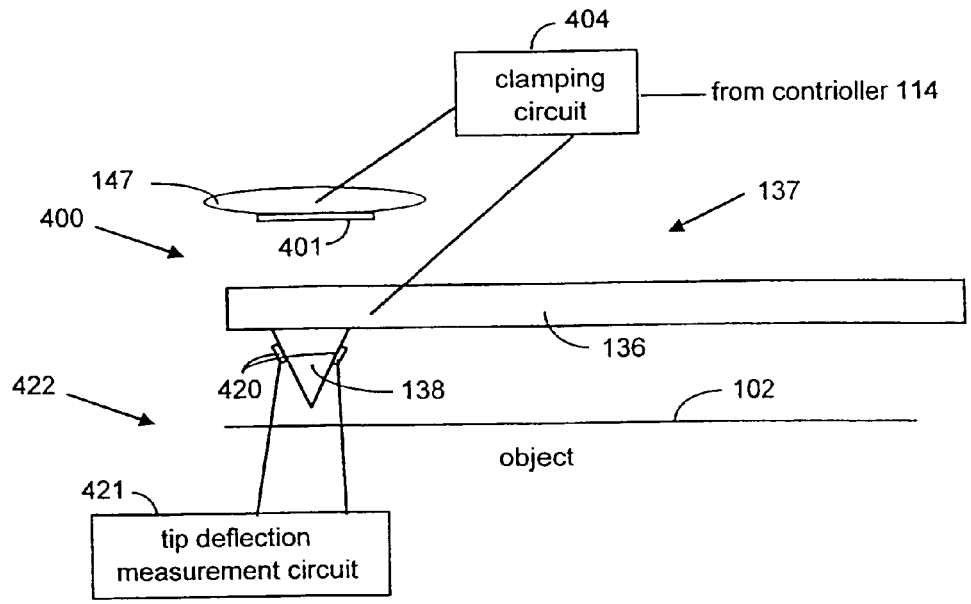
Figure 4B:
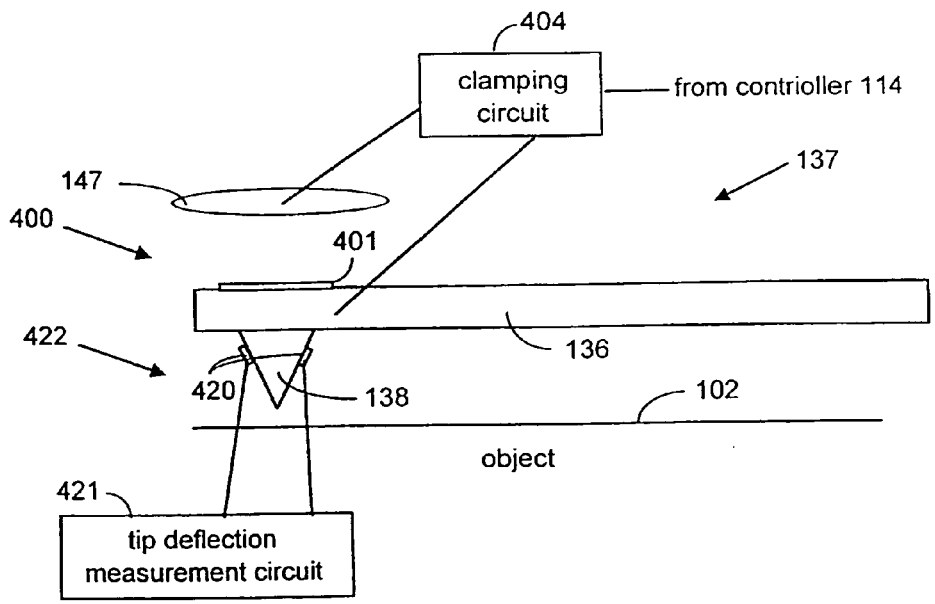

Referring to FIGS. 4*a* and 4*b*, the lens 147 of each tool 137 may include a clamping device 400 to provide clamping of the cantilever 136 of the tool 137. An optically transparent insulating layer 401, such as silicon dioxide, is formed on the lower surface of the lens 147 (or similar support member) or the upper surface of the cantilever 136. For STM and/or NSOM measurements and for making cuts in the object 102, the controller 114 causes the clamping circuit 404 of the other components 123 of the SPM system 100 to apply an appropriate voltage between the lens 147 and the cantilever 136 so as to form a capacitive structure which electrostatically clamps the motion of the cantilever 136. Those skilled in the art will appreciate that this configuration can additionally be used to damp, drive, or detect the motion of the cantilever 136 depending on how the tool 137 is being used.

Figure 4C:
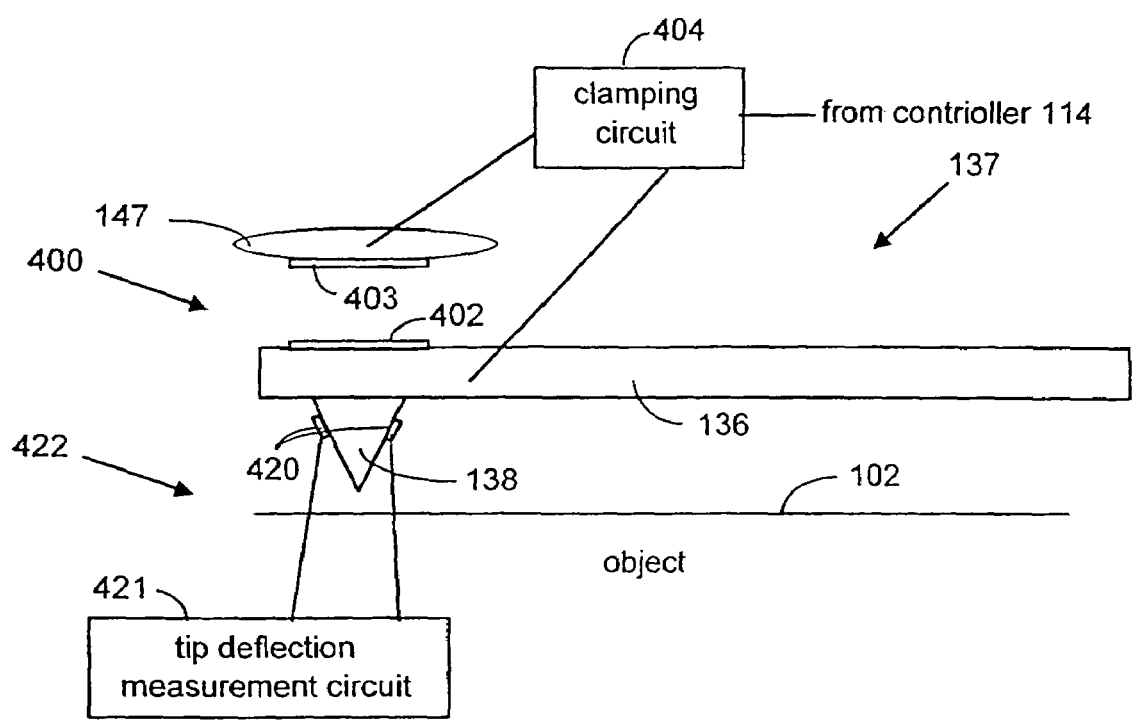

Alternatively, the clamping device 400 may comprise optically transparent and conductive coil patterns 402 and 403 respectively formed on the lower surface of lens 147 and the upper surface of the cantilever 136, as shown in FIG. 4*c*. The coil patterns 402 and 403 may be formed from Indium Tin Oxide. For STM and/or NSOM measurements and for making cuts in the object 102, the controller 114 causes the clamping circuit 404 to apply voltages to the coil patterns 402 and 403 so that their currents are opposite in direction. As a result, an attractive magnetic field is created which immobilizes (i.e., clamps) the cantilever 136. Those skilled in the art will appreciate that one of the coil patterns 402 or 403 may be replaced with a permanent magnet formed with a thin film of samarium cobalt or other permanently magnetizable material. Moreover, this arrangement may also be used to damp, drive, or detect the motion of cantilever depending on how the tool 137 is being used.

Figure 10A:
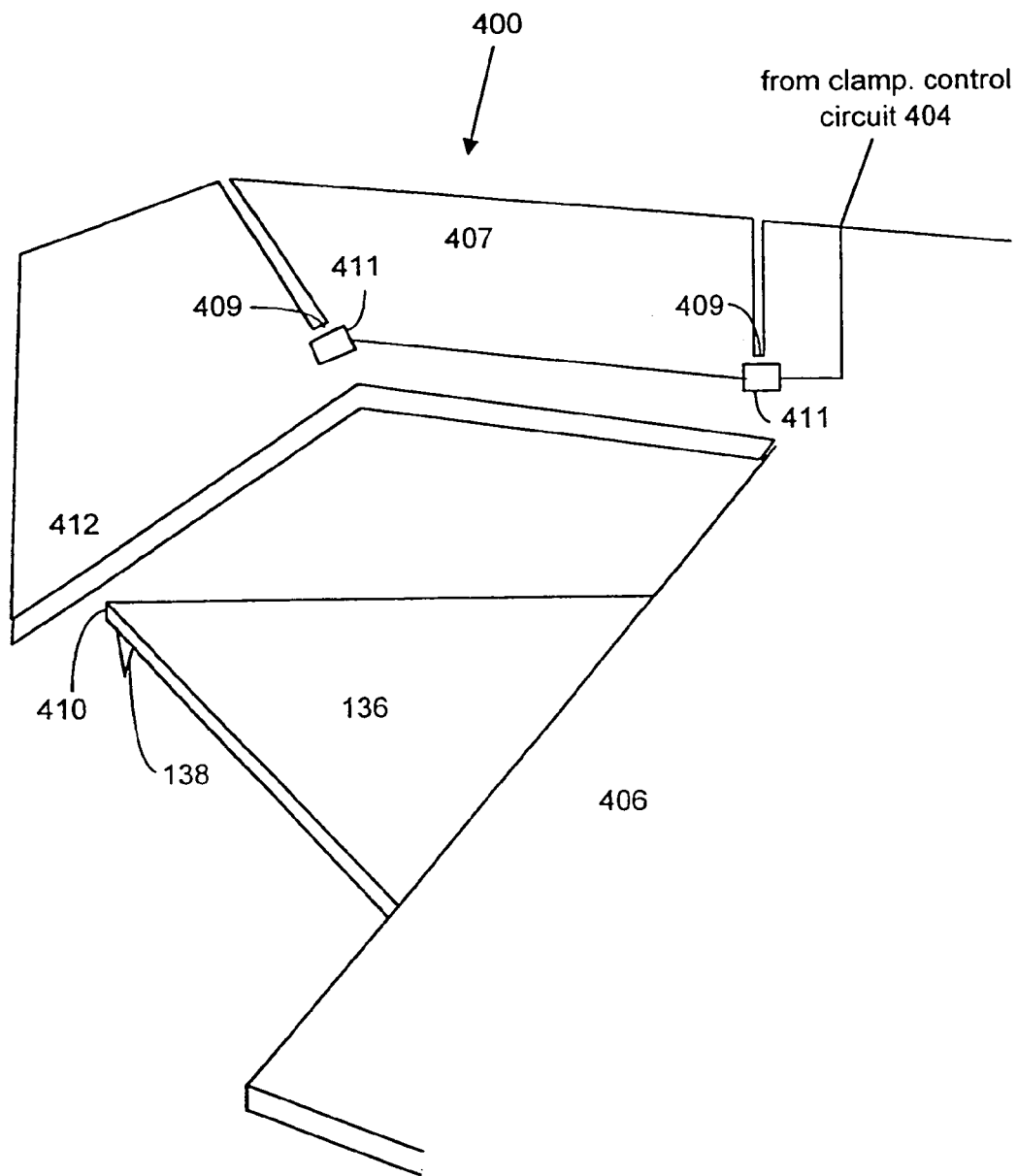
Figure 10B:
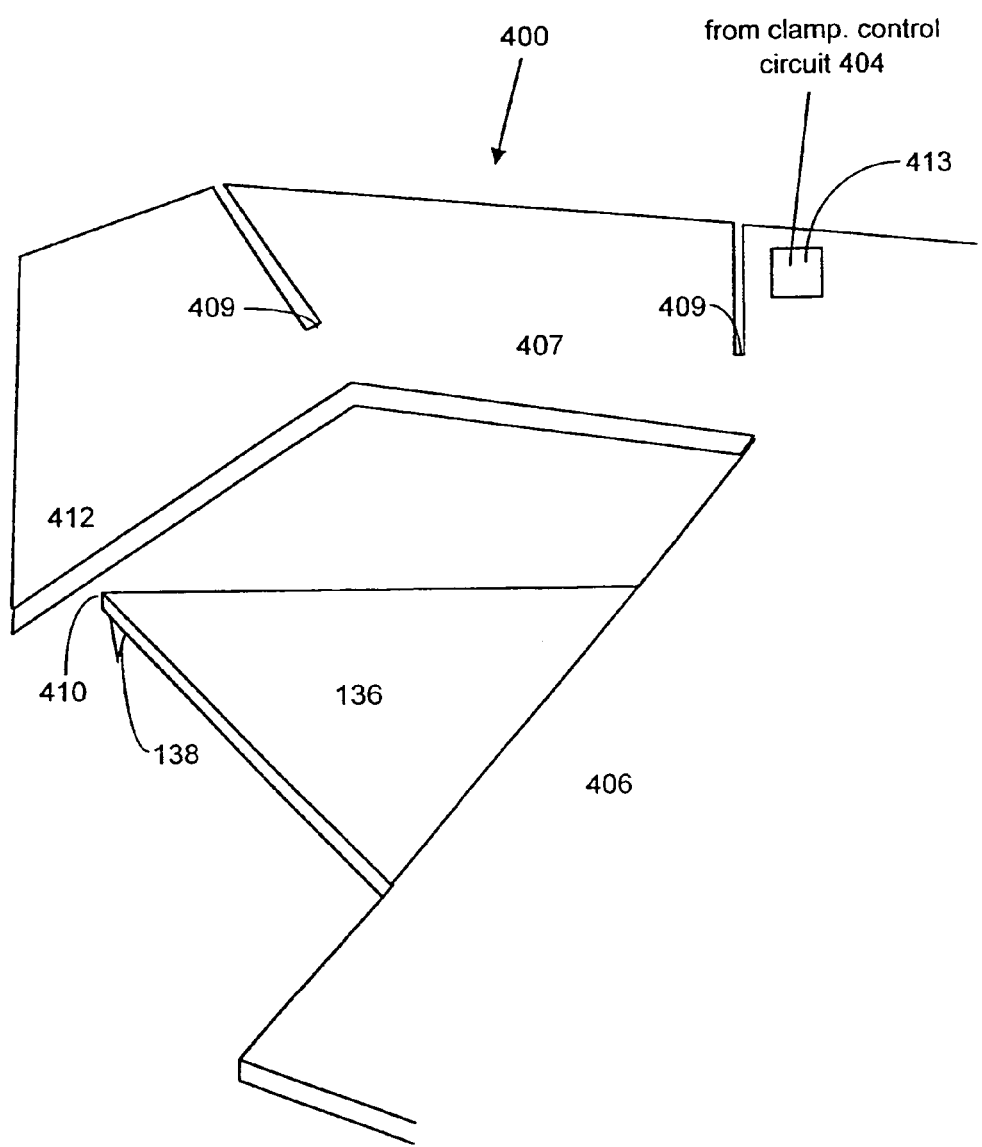

FIGS. 10*a* and 10*b* show other alternative configurations for the clamping device 400. In this case, the SPM probe 122 comprises a cantilever assembly 405 that comprises a base 406, the cantilever 136, the tip 138, and the clamping device 400. The clamping device 400 comprises a clamping arm 407 integrally connected to the base 406. The lens 147 and the lens support 149 of the SPM probe 122, which are shown in FIG. 2 and described earlier, are not shown in FIGS. 10*a* and 10*b* for ease of illustration. The clamping arm 407 is L-shaped and extends out from the base 406 past and adjacent to the free end 410 of the cantilever 136. The clamping arm 407 has slots 408 which form action joints 409 at the closed ends of the slots 408.

In the configuration shown in FIG. 10*a*, heating elements 411 are disposed on the clamping arm 407 at the action joints 409. For STM and/or NSOM measurements and for making cuts in the object 102, the controller 114 causes the clamping circuit 404 to generate a clamping arm movement signal provided to the heating elements 411. The heating elements 411 are responsive to the clamping arm movement signal and heat the action joints 409 so that the clamping arm 407 thermally expands at the action joints 409 and the free end 412 of the clamping arm 407 moves in and presses firmly against the free end 410 of the cantilever 136. As a result, the cantilever 136 is immobilized and held rigidly against the clamping arm 407.

Alternatively, an electrode 413 may be fixed to the clamping arm 407, as shown in FIG. 10*b*. In response to the clamping arm movement signal provided by the clamping circuit 404, the electrode 413 applies an electrostatic charge to the clamping arm 407. As in the configuration of FIG. 10*a*, the clamping arm 407 expands at the action joints 409 so that the free end 412 of the clamping arm 407 moves in and presses against the free end 410 of the cantilever 136.

Figure 11A:
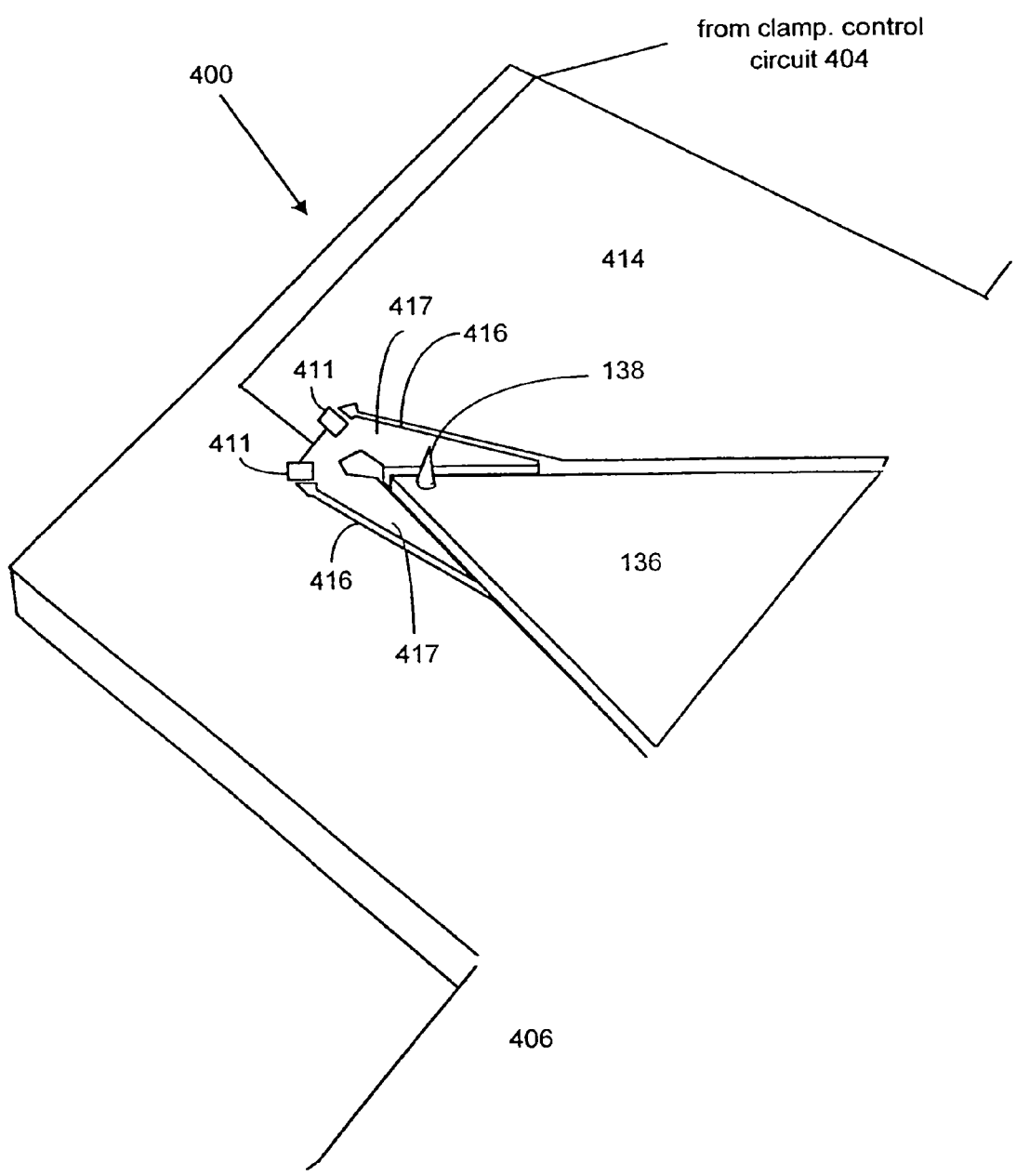
Figure 11B:
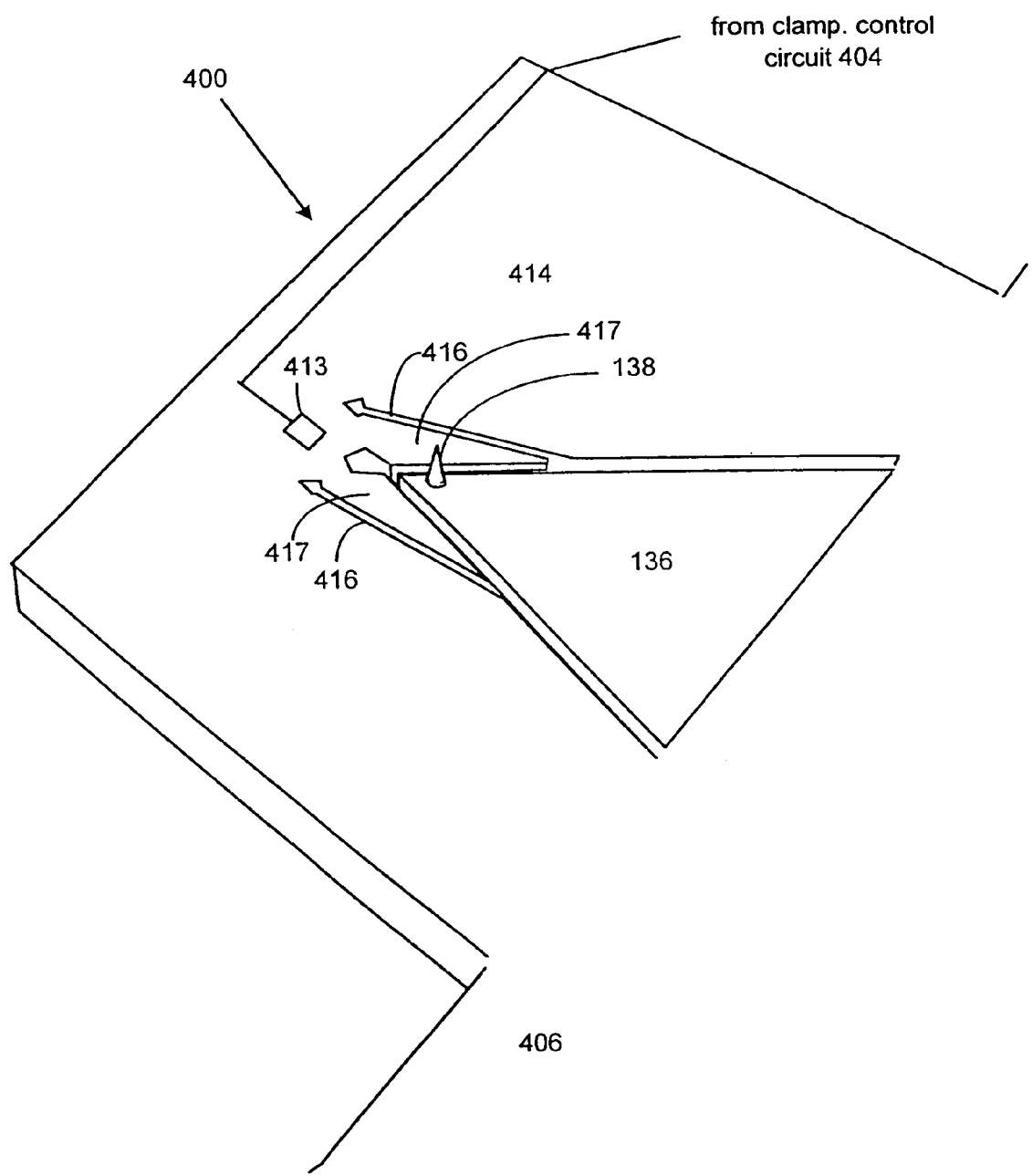

FIGS. 11*a* and 11*b* show other alternative configurations for the clamping device 400. Here, a clamping structure 414 that is integrally formed with the base 406 and surrounds the cantilever 136. The clamping structure 414 has slots 415 which form action joints 416 at the closed ends of the slots 415. Similar to the embodiment of FIG. 10*a*, heating elements 411 are disposed on the clamping structure 414 at the action joints 416. For STM and/or NSOM measurements and for making cuts in the object 102, the controller 114 causes the clamping circuit 404 to generate a clamping structure movement signal provided to the heating elements 411. The heating elements 411 heat the action joints 416 so that the clamping structure 414 expands at the action joints 416 and the clamping arms 417 of the clamping structure 414 move in and press firmly against the sides of the cantilever 136.

Alternatively, an electrode 413 may be fixed to the clamping structure 414, as shown in FIG. 11*b*. Similar to the configuration of FIG. 10*a*, the electrode 413 applies an electrostatic charge to the clamping structure 414 in response to the clamping structure movement signal provided by the clamping circuit 404. As in the configuration of FIG. 11*a*, the clamping structure 414 expands at the action joints 416 and the clamping arms 417 move in and press against the sides of the cantilever 136.

Referring back to FIG. 2, and as mentioned earlier, the probe 122 has multiple tools 137 each comprising a cantilever 136 and a tip 138 on the cantilever. Thus, when the tip of one of the probe's tools is determined to be defective in the manner to be described later, then another one of the probe's tools with a tip determined not to be defective can be used for inspecting the object 102 without having to load another probe of this type.

Figure 5:
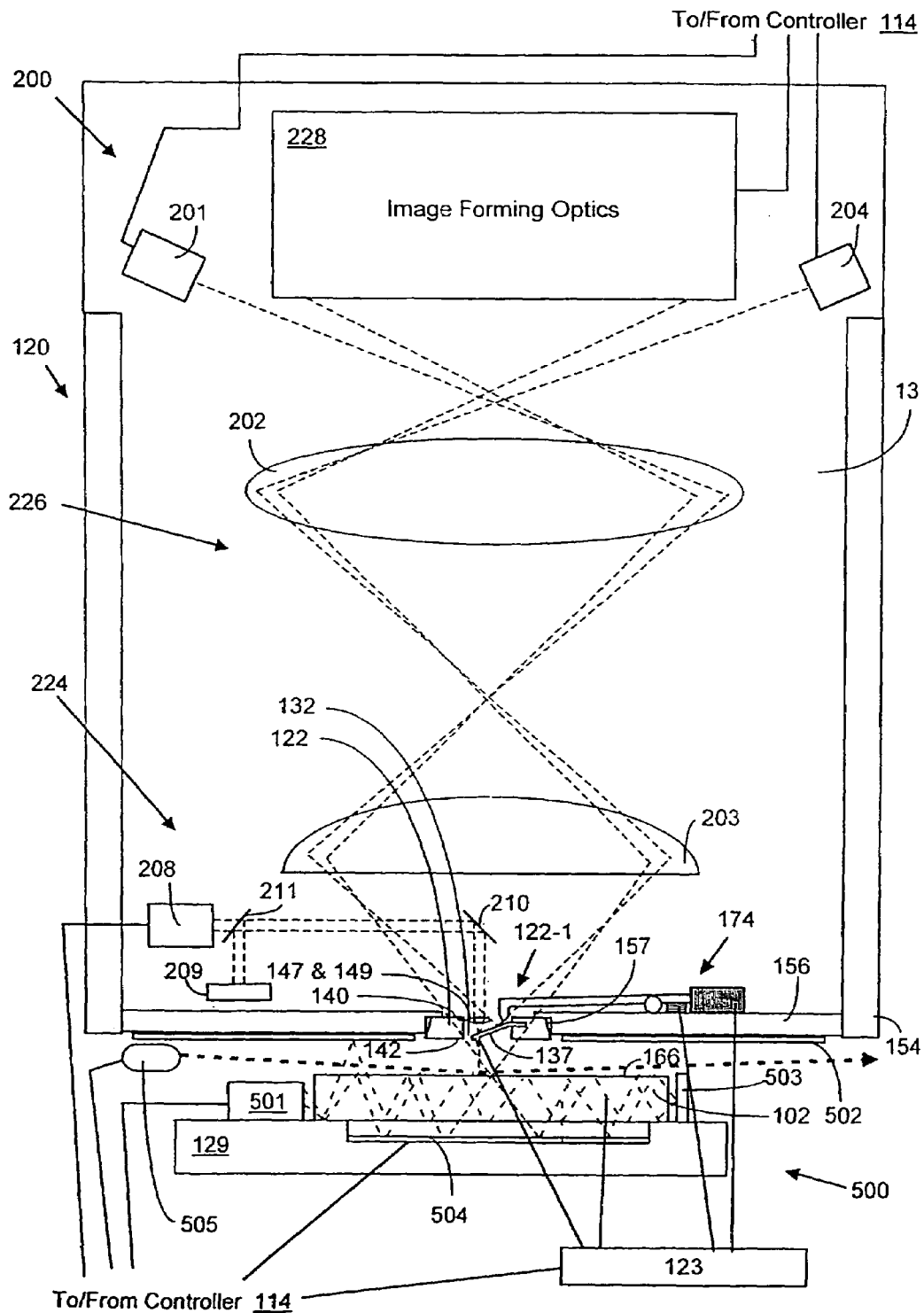
FIGS. 5 to 8 show different views of a scanning head of the SPM system of FIG. 1.
Figure 6:
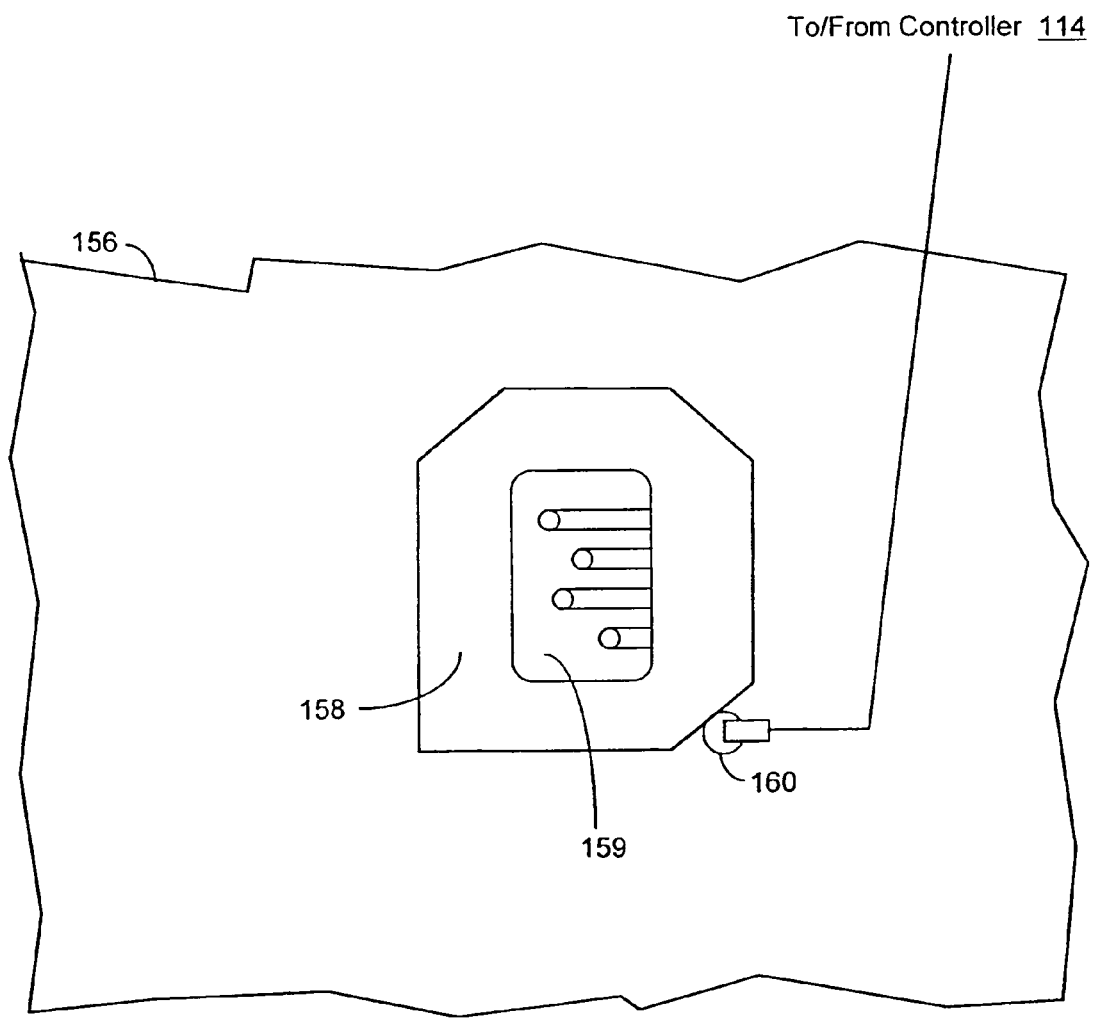

FIG. 5 shows the way in which the probe 122 is loaded onto one of the scanning heads 120. The scanning head includes a housing 154 with a probe holding plate 156. As shown in FIG. 6, the probe holding plate includes a seat 158 formed by a recess in the probe holding plate that is in the shape of the base of the probe and seats (or holds) the probe. And, the other components 123 of the SPM system 100 include a rotary cam assembly 160 that is formed in the probe holding plate. Thus, when the probe is being loaded onto the scanning head in the manner described earlier, the controller 114 controls the rotary cam assembly so that its rotary cam rotates and presses against the probe and locks it into place in the seat of the probe holding plate. In this way, the probe is loaded onto the scanning head. Similarly, when the probe is being unloaded from the scanning head in the manner described earlier, the controller controls the rotary cam assembly so that the rotary cam rotates and no longer presses against the probe and unlocks it from the seat of the probe holding plate.

Furthermore, as shown in FIG. 3, the base 130 of the SPM probe 122 has a tapered outer perimeter surface 157 so that the bottom surface 142 has an area larger than that of the top surface 140. In addition, referring to FIG. 6, the bottom surface has an area larger than that of the recess that forms the seat 158 in the probe holding plate 156. Thus, as shown in FIG. 5, when the probe is loaded onto one of the scanning heads 120, the base of the probe is wedged into the recess so that the probe is properly seated in the seat of the scanning head's probe holder 156 with no movement between the probe and the probe holding plate.

Figure 7:
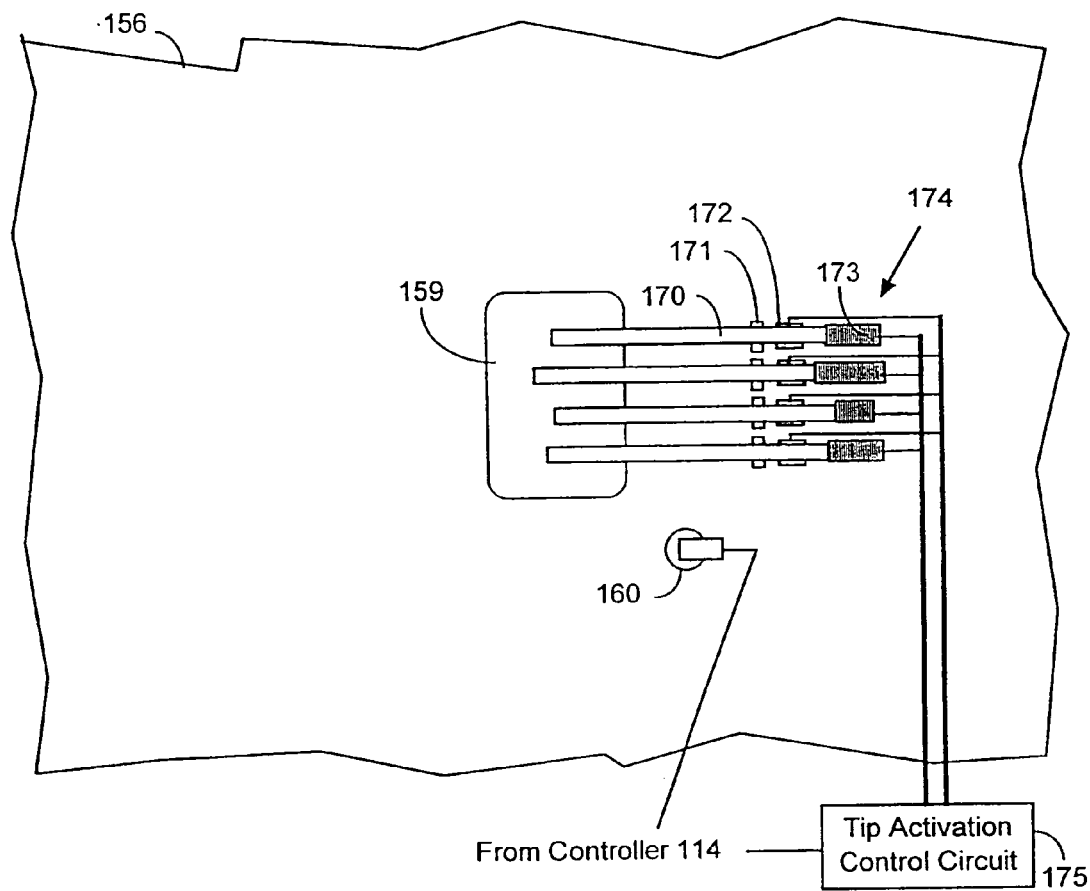

Referring now to FIGS. 5 and 7, fixed to the probe holding plate 156 are tip actuators 174 that are each used to selectively activate and deactivate a corresponding tip 138 of the SPM probe 122 for use in inspecting the object 102. Each tip actuator includes an L-shaped lever arm 170, a pivot 171, an engagement transducer 172, and an adjustment transducer 173. The L-shaped lever arm has one end fixed to the engagement and adjustment transducers and a rounded end that extends into an aperture 159 in the seat 158 of the probe holding plate 156. The engagement and adjustment transducers may each comprise a material, such as a piezoelectric material or a resistive metal (e.g., Nickel Chromium alloy), which change dimensions when a voltage or current signal is applied to it. Alternatively, electromagnetic or electrostatic transducers or actuators could be used.

Figure 8:
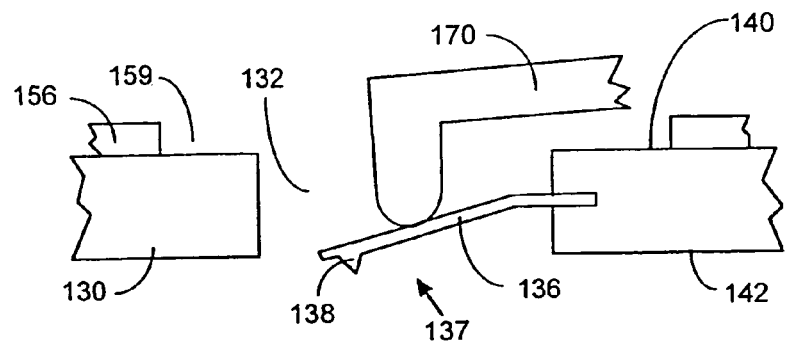

The other components 123 of the SPM system 100 also include a tip actuator control circuit 175. In selectively activating the tip 136 of one of the SPM tools 137 of the SPM probe 122, the controller 114 causes the control circuit to control the change in dimension of the engagement transducer 172 of the corresponding tip actuator 174 so that it pushes up on the end of the lever arm 170 to which it is fixed. In response, the lever arm pivots on the pivot 171 and, as shown in FIG. 8, the rounded end of the lever arm extends down through the aperture 159 in the seat 158 of the holding plate 156 and into the corresponding aperture 132 of the probe. In doing so, the rounded end engages and presses against the corresponding cantilever 136 so as to push down on it. As a result, the cantilever bends so that the tip 138 on the cantilever is moved below the lower surface 142 of the base 130 of the probe and is activated for operation in inspecting the object 102. Similarly, the tip is selectively deactivated when the controller controls the change in dimension of the engagement transducer 172 of the corresponding tip actuator so that it pulls down on the end of the lever arm to which it is fixed. In response, the lever arm pivots on the pivot and the rounded end of the lever arm extends up so that the cantilever bends up until the tip is located above the lower surface of the base. As a result, and tip is then protected against being damaged.

In alternative embodiment, each tool 137 of the probe 122 may include an electrostatic (i.e., capacitive) tip actuator. Such a tip actuator would be configured and operate like those described in PCT Patent Application Nos. PCT/US98/01528 referenced earlier.

Referring to FIG. 5, each scanning head 120 has imaging optics 226. The imaging optics are used to make an optical image of the object for properly inspecting the object 102 with the probe 122. These imaging optics 226 include image forming optics 228 and the lenses 202 and 203. The image forming optics may be conventional or confocal image forming optics as found in a conventional or confocal microscope. This kind of arrangement may be configured in the manner described in U.S. patent application Ser. No. 08/613,982 referenced earlier where the image forming optics are located externally from the scanning head.

The imaging optics 226 may be used to produce a low magnification optical image of the object 102 or a calibration structure 128. Specifically, the controller 114 causes the positioning system to scan the object 102 or a calibration structure 128 with the scanning head 120. At each scan point, the image forming optics 228 causes light to be directed to the lenses 202 and 203 which focus the light on the object or calibration structure. The resulting light reflected by the object or calibration structure is directed back to the image forming optics by the lenses. The image forming optics detects this resulting light and in response forms an optical image of the object or calibration structure. This optical image is then provided to the controller.

The optical images produced by the imaging optics 226 may be used by the controller 114 in various ways. They may be used in conjunction with SPM measurements to inspect the object in the manner described in U.S. patent application Ser. Nos. 08/906,602, 08/885,014, 08/776,361, and 08/613,982. Or, they may be used to produce complete images of the modifications being made to the object or the calibrations being made to the probe 122. Specifically, the image optics may be used to find reference points and/or specific (optically) resolvable structures to be modified and/or inspected.

Referring again to FIG. 1, the activated tip 138 of the probe 122 may be used to inspect the object 102 by performing SPM measurements of the object. Thus, when the user instructs the controller 114 with the user interface to use the activated tip to perform SPM measurements, the controller controls the positioning subsystem 103, the corresponding components 123 of the SPM system 100, and, as needed, the probe in inspecting the object 102. This is done by causing the probe to be scanned over the object and the desired SPM measurements of the object to be made at selected scan points.

For example, turning to FIG. 5, the SPM measurements may include AFM measurements made by scanning the activated tip 138 over the surface 166 of the object 102 and measuring the deflection of the cantilever 136 on which the tip is located at selected scan points. This is done with the cantilever deflection measurement system 200. The cantilever deflection measurement system has optics that comprise a light source 201, lenses 202 and 203, and a photodetector 204. As is well known to those skilled in the art, the optics 201 to 204 are used as an interferometer to optically detect and measure the deflection of the cantilever 136. This kind of arrangement may be configured in the manner described in U.S. patent application Ser. No. 08/613,982 referenced earlier where the light source and photodetector are located externally from the scanning head. Alternatively, the cantilever deflection measurement system may comprise components to electrostatically (i.e., capacitively) or piezoelectrically detect and measure the cantilever deflection.

Furthermore, the SPM measurements may also include STM measurements made by scanning the activated tip 138 over the surface 166 of the object 102 and causing and measuring a tunneling current between the activated tip and the object at selected scan points. This is done with an STM measurement circuit in the same way as described earlier for calibrating the positioning of the tip 138. The STM measurement circuit is one of the other components 123 of the SPM system 100.

The SPM measurements may also include radiation measurements made by scanning the activated tip 138 over the surface 166 of the object 102 and causing optical interaction between the tip and the object 102 at selected scan points. This may done in the manner discussed earlier for calibrating the position of the tip.

The SPM measurements just described may be combined together or used separately by the controller 114 to generate the inspection data for the object 102. As described earlier, this may include an image of the object and/or various analysis of the object and may be done in the manner described in U.S. patent application Ser. Nos. 08/906,602, 08/885,014, 08/776,361, and 08/613,982 referenced earlier.

For example, the AFM, STM, and radiation measurements may be combined to generate an image of the object with the AFM measurements being used to produce the basic image and the STM and radiation measurements being used to supplement the basic image. The AFM measurements would provide information about the heights of the surface at the various scan points. The STM measurements would provide information on the electrical properties of the object with which to supplement the basic image and the radiation measurements would provide information on the composition of the object (from the measured wavelength spectrum) with which to supplement the basic image. In addition, if the narrow beam of light used in producing the radiation measurements is rotationally polarized, as described in the patent applications just referenced, then the radiation measurements can be used to identify deep surface features, such as a pit, wall, or projection, and supplement the basic image with this information. Additionally, the STM measurements could simply be used by themselves to generate an electrical map or analysis of the object's conductivity and electrical properties according to the positioning of the tip in making the STM measurements. And, the radiation measurements could be used to generate a compositional analysis on the composition of the object mapped according to the positioning of the tip in making the radiation measurements. The AFM, STM, and radiation measurements can be made simultaneously during the surface scan using an activated tip 138 of the SPM probe 122.

Furthermore, as discussed earlier, the inspection data may be used to modify the object 102. In doing so, the controller 114 may compare the generated inspection data with target data that it stores. The target data may include a target image and/or analysis of the object which are compared with the generated image and/or analysis of the object. The resulting modification data from this comparison indicates where and how the object needs to be modified in order to fall within a predefined tolerance level of the reference parameters. Then, based on the modification data, the controller controls modification of the object 102 using the probe 122 or one or more of the other SPM probes described herein.

Referring to FIGS. 1, 5, and 8, as mentioned earlier, an activated tip 138 of the SPM probe 122 can also be used to make SPM modifications of the object 102 by making cuts in the material of the object. This is done when the user instructs the controller 114 with the user interface 116 to use the SPM probe 122 to perform this operation. In the manner described earlier, the controller 114 controls loading of the cutting probe onto the scanning head 120 and the activation of the tip 138 of one of the tools 137 of the SPM probe 122. Then, the controller 114 controls the positioning system 103 to lower the activated tip 138 onto the material of the object 102 such that the activated tip pushes down on the material with sufficient force to make a desired cut in the material when the tip is dragged across it. Then, the controller 114 causes the positioning system 103 to drag the tip in this way and make the desired cut. The controller 114 then causes the positioning system 103 to raise the tip from the cut or return it to the beginning of the cut stroke without lowering it into the material.

As mentioned earlier, the SPM probe 122 may have multiple cutting tools 137. These tools 137 may have different tips 138 with different cutting angles. In this case, the controller 114 selects the cutting tool 137 with the appropriate cutting angle to perform the desired cut.

The amount of force with which the activated tip 138 of the SPM probe 122 pushes down on the material may be selected and selectively adjusted. Referring back to FIGS. 7 and 8, the controller 114 causes the tip activation circuit 175 to control the tip actuator 174 in order to do this. Specifically, the tip activation circuit causes a change in the dimension of the adjustment transducer 173 so that it pushes or pulls against the end of the lever arm 170 to which it is fixed. In response, the lever arm is moved over the pivot 171 so that the pivot point of the lever arm (about which the lever arm pivots on the pivot) will change. This changes the point at which the rounded end of the lever arm contacts the cantilever 136 on which is located the activated tip. Since this contact point is also a pivot point for the deflection of the cantilever, the amount of force imparted on the target area depends on the location of this contact point. In this way, the amount of force imparted by the activated tip can be selected and selectively adjusted.

This is particularly useful in repairing and/or performing fabrication steps on a semiconductor wafer or fabrication mask. In particular, when excess material is on the wafer or mask, the SPM probe 122 may be used to perform a precise cut to remove or etch away this material.

Moreover, this is also useful in performing precision repairs and/or fabrication steps of a magnetic microstructure. Specifically, a gap between magnetic elements of the magnetic microstructure can be precisely created and/or repaired by using the SPM probe 122 to perform a precise cut in the magnetic material between the magnetic elements. This is particularly applicable to creating or repairing the gap between the write and read poles of the thin film magnetic material of a thin film magnetic read/write head.

Cutting Techniques

Referring back to FIG. 1, in making cuts in the object 102 with the SPM probe 122 shown in FIGS. 2 to 11 and described, it is desirable to monitor the loci of the tip 138 of the SPM probe 122. To do so, the controller 114 uses a dc servo closed loop in which the deviation of the tip 138 is corrected from the loci of the guide topography or true surface. This may be done by measuring the deflection of the cantilever 136 electrostatically (i.e., capacitively), piezoelectrically, interferomically, or by some other means using the cantilever deflection measurement system 200 described earlier.

In addition, referring back to FIGS. 4a to 4c, the other components 123 of the SPM system 100 may include a tip motion detection system 422. In this case, the tip 138 can be configured so that one or more secondary sensors 420, such as a piezoelectric plate, tube or other geometry, of the tip motion detection system 422 are located and mechanically coupled on or near the tip 138. As a result, one or more force measurements can be made by a tip deflection measurement circuit 421 of the tip motion detection system 422 using the sensors 420 to measure the local motion or deflection of the tip 138 while cutting. This allows a compensating reposition of the tip 138 to be made by the controller 114 using the positioning system 103.

However, the local motion or deflection of the tip 138 can instead be approximated by alternately holding the tip 138 rigid or clamped with the clamping device 400 through one vector of cutting motion (or set of vectors) and then sensing the surface of the object 102 with the tip 138 by making SPM measurements for some distance. This information is then used by the controller 114 to set and clamp the tip 138 for the next series of cuts. This sampling and adjustment or open loop operation may be done by sampling after every vector of cut motion or less frequently in order to minimize the time required to perform a cutting operation.

The tip 138 which is vibrated when used to make AFM measurements, may be clamped (i.e., stopped) with the clamping device 400 in vibration over the surface of a known object 102 under the control of the controller 114. The tip 138 is then moved closer to the surface in known increments with the positioning system 103 under the control of the controller 114 until (1) the cantilever deflection measurement system 200 detects force on the tip due to contact with the known surface, and/or (2) the tip motion detection system 422 shows that the increment of actual movement of the tip is less then the magnitude of the impulse movement imposed by the positioning system 103 with respect to the surface. Then, under either or both of the latter two conditions, the tip 138 is presumed to be in contact with the surface and its steady or clamped position with relation to the surface is then characterized and known by the controller 114. This clamped position information is then used by the controller 114 to reposition the tip 138 with the positioning system 103 after a surface scan of an unknown object 102 during all or a portion of a nanomachining operation, including SPM measurement and cutting, or multiple nanomachining operations until the tip 138 is worn or replaced.

As mentioned previously, the tip 138 may be vibrated in a non-contact mode (as is well known in the art) under the control of the controller 114 with the positioning system 103 for making AFM measurements. But, during cutting, the tip 138 can also be vibrated and made to follow the three space loci of the desired form or cut. In this case, the controller 114 can use the clamping device 400 to dampen and control the vibration to a limited range of a few nanometers or less. The amplitude of the vibration is controlled to be within the error range of the cut or a desired loci of the target surface. This vibrating motion of the tip 138 helps clear the material that was cut and prevents mechanical or van der Waals binding of the tip 138 to the remaining material of the object 102. Additionally, the damped vibration in the cut is monitored to determine when the loci of the cut is in a clear or non-cut area so that an inspection using AFM measurements may optionally be begun by freeing the servo control to operate again to scan the surface or volume.

Finally, to locate the surface of the object 102 for making a cut, the controller 114 controls the positioning system 103 in lowering the tip 138 so that the tip 138 is made to contact the surface. Then, the tip 138 is withdrawn until it is at point just on the surface. This is done by determining the point at which there is no more deflection of the cantilever 136 using the cantilever deflection measurement system 200 and/or by observing that the motion of the tip 138 away from the surface in the positioning system 103 is equal to the detected motion by the tip motion detection system 422. At this point, the tip 138 is then T clamped in place with the clamping device 400 in preparation for cutting.

Illumination Technique

Referring to FIG. 5, in nanomachinng and SPM measurement, it is desirable to examine optically a parallel plate or optically transparent object 102, such as a lithographic mask, a lens, an optical element, or mirror, in transmitted light, backlight, rear illuminated scattered (i.e., darkfield) light or in combinations thereof in conjunction with a support stage 129 which is opaque or reflective. The illumination system 500 shown in FIG. 5, which is one the other components 123 of the SPM system 100, provides such transmitted, darkfield, or combined illumination so that the support stage 129 can be opaque or reflective and not partial or fully transparent.

In operation, the controller 114 controls the side injection light source 501 of the illumination system 500 to generate light. The light source 501 is optically coupled to the object 102, for example a semiconductor chromium mask, to direct the light to the object 102. The light propagates through the object 102 and is reflected internally by reflective structural elements of the object 102. Any propagating light that passes through the object 102 may then be reflected by the support stage 129, reflective material 502 of the illumination system 500 located on the probe holding plate 156 of the housing 154 of the scanning head 120, and a reflective edge 503 back into the object 102. The propagating light may also be reflected internally within the object 102 by various reflective structural elements of the object 102. For example, in a semiconductor chromium mask, the light is reflected by the chrome layer on the top of the mask and, where the chrome is missing, light would be reflected by the reflective material 502 on the scanning head 120. The propagating light eventually reaches the region in which the light will be imaged or detected by the imaging optics 226.

In one mode of operation, the light level is constantly adjusted by the controller 114 by controlling the light source 501 and monitoring the light detected by the imaging optics 226 so as to maintain a constant illumination level. Alternatively, the intensity of the light can be a direct function of the position of the object 102 under the imaging optics 226. Specifically, when the imaging optics 226 are close to the light source 501 and the object 102, the intensity is low while the intensity is high when the imaging optics 226 are far away. Although only one axis of light injection is shown, normally two or more such axis of light injection and control may be used.

Furthermore, a flat light source 504, such as an electroluminescent panel, of the illumination system 500 may be used under the control of the controller 114 to separately or in conjunction with the side injection light source 501 provide rear illumination in a similar manner. The light source 504 is arranged in the recess (or depression) of the support stage 129 below the object 102 so that object 102 is only supported on the support stage 129 outside the concentric rectangular reticle area of the support stage 129. The object 102 may be supported and transferred in an appropriate intermediate carrier which permits objects of different dimensions to be used in a system set up for the largest object (with object carrier). And, in this arrangement, the side injection light source 501 may be integrated in whole or partially in the object carrier as may be the flat light source 504.

Additionally, one or more highly collimated light sources 505, such as a laser, of the illumination system 500 may be arranged outside the support stage 129 and fixed in position with respect to the scanning head 120 or configured to move to follow or attached to a structure carrying the scanning head 120. Under the control of the controller 114, these light sources 505 illuminate the area in view of the imaging optics 226 and provide illumination of the area of interest. This illumination may be provided incidently or in a ultramicroscopic darkfield manner as shown. Or, this illumination may be done by injection into the object 102, such as the side injection done with the light source 501, to provide various forms of backlighting to the object 102. When injected into the side of the object 102, these light sources 505 would still remain fixed with respect to the scanning head 120. But, their intensity may be changed (depending on the bounce angle) to compensate for light loss due to multiple bounces across the object 102. Similar to that described earlier, the intensity adjustment would be a function of the bounce angle and the position of the object 102 under the scanning head 120.

Repair and/or Fabrication of Masks and/or Wafers

As an example, the SPM system 100 may be used to perform precision repairs of a completed mask or wafer after fabrication. In fact, the SPM system may even be used to perform precision repairs and/or fabrication steps of a partially completed mask or wafer during fabrication. These repairs and/or fabrication steps comprise structurally and/or chemically modifying the material of the mask or wafer by removing, deforming, and/or chemically changing a portion of it or adding other material to it.

For example, the SPM system 100 may be provided with initial repair and/or fabrication guide or inspection data for a mask or wafer that was previously inspected by a conventional mask or wafer inspection system. The provided initial repair and/or fabrication guide or inspection data may identify where and how a repair and/or a fabrication step is to be performed on the mask or wafer.

Using one or more of the SPM probes 122 and/or some of the other components 123 of the SPM system, the controller 114 locates a reference point on the wafer or mask. Then, using the reference point and the provided repair and/or fabrication inspection data, the controller may cause an inspection of the wafer or mask to be made where the repair and/or fabrication step is to be performed. This is done with one or more of the SPM probes 122 in the manner briefly described earlier and will described in greater detail later. As a result, inspection data is generated which comprises an image and/or analysis of the mask or wafer. By comparing the generated inspection data with target data stored by the controller, repair and/or fabrication (i.e., modification) guide data is generated by the controller 114. Then, based on the additional repair and/or fabrication guide data, the controller causes the repair and/or fabrication step to be performed on material of the object with one or more of the SPM probes 122 and under the direction of the user. This is done in the manner described earlier.

Alternatively, the controller 114 may use repair and/or fabrication guide data to directly make the repair and/or fabrication step without making an initial inspection. In this case, the controller 114 locates the reference point on the wafer or mask with one of the SPM probes 122 and then performs the repair and/or fabrication step with this SPM probe and/or one or more other SPM probes 122. Or, the controller 114 may simply locate the surface of the wafer or mask with the SPM probe 122 and then perform the repair and/or fabrication step.

Then, the controller 114 causes another inspection of the mask or wafer to be made after the repair and/or fabrication step. This inspection may be done with or without any of the SPM probes 122 in the manner described earlier. Furthermore, this may be done in such a way that the mask or wafer is inspected so as to simulate or emulate its use in the environment in which it is normally used.

For example, in the case of a mask, some of the other components 123 of the SPM system 100 and/or one of the SPM probes 122 would cause radiation to be directed at the mask. Such radiation may comprise electromagnetic energy, such as radio frequency waves, gamma rays, xrays, ultraviolet light, infrared light, visible light, and/or charged particles, such as protons, electrons, alpha particles, or ions. The resulting radiation that would be projected by the mask onto a wafer or that would be reflected and/or emitted by the mask would then be detected by some of the other components of the SPM system 100 and/or one of the SPM probes 122. From the detected radiation, the controller 114 generates and displays a patterned image of the detected radiation so as to emulate the way in which the mask would expose a wafer to radiation during actual fabrication of the wafer.

Alternatively, one or more of the SPM probes 122 may be used to make SPM measurements of the mask which are used by the controller 114 to produce a structural image of the mask in response. From this produced structural image, the controller 114 would simulate the detection of resulting radiation that would be projected by it or reflected and/or emitted by it in response to radiation directed at it. From this simulation, a patterned image of the detected radiation is generated.

In either case, the controller 114 compares the generated patterned image with a recorded target patterned image or criteria to generate repair and/or fabrication guide data that identifies any further repair and/or fabrication step to be performed on the mask. The controller 114 then causes the entire process to be repeated until the generated patterned image has converged to the target patterned image or criteria within the specified tolerance level.

Furthermore, in the case of a wafer, one or more of the SPM probes 122 may be used to make SPM measurements of the wafer. These SPM measurements may be used by the controller 114 to generate an analysis of the properties, operation, and/or characteristics of the wafer and/or a structural image of the wafer. This generated analysis and/or image is then compared with a target analysis or image to generate repair and/or fabrication guide data that identifies that identifies any further repair and/or fabrication step to be performed on the wafer. The controller 114 then causes the entire process to be repeated until the generated analysis and/or image converges to the target analysis or image within the specified tolerance level.

CONCLUSION

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a scanning probe microscope and/or nanomachining system having scanning probe functionality and non-scanning-probe functionality, the system including a probe and/or tool, the probe and/or tool collectively being referred to as the probe, positioned relative to a sample volume and having relative motion between the probe and the sample volume in the X, Y and Z space and controlled and sensed in desired directions with respect to the sample volume and/or any element thereof, the sample volume and/or any element thereof collectively being referred to as the sample volume, and producing data responsive to the sample volume and/or a property of the sample volume, a method for accurately measuring a parameter of the sample volume or performing a task related to the sample volume, the method including the following steps:
    providing a first scan, by the probe, on the sample volume in X, Y and Z to produce data representative of a true surface of the sample volume, the true surface including at least one portion that is a non-function wherein for at least one pair of x,y coordinate values, there is more then one z coordinate value, and
    storing the data representative of the sample volume, and/or data representative of any parametric representation of the sample volume.

2. The method of claim 1 wherein the first scan produces volume data by at least one of an atomic force measurement and a tunneling current measurement.

3. The method of claim 1, and further comprising providing a second scan that is used to modify the sample volume.

4. The method of claim 3 wherein the modification is accomplished by the probe mechanically cutting the sample volume.

5. The method of claim 1, and further comprising:
    providing a second operation based on the information previously obtained, and
    measuring a portion or all of the volume or any other parameter associated with the volume or making any change to said volume.

6. In a scanning probe microscope and/or nanomachining system having scanning probe functionality and non-scanning-probe functionality, the system including a probe and/or tool, the probe and/or tool collectively being referred to as the probe, positioned relative to a sample volume and/or topography and having relative motion between the probe and the sample volume and/or topography in the X, Y and Z space and controlled and sensed in desired directions with respect to the sample volume and/or topography and/or any element thereof, the sample volume and/or topography and/or any element thereof collectively being referred to as the sample volume and/or topography, and producing data responsive to any element or property of said sample volume and/or topography, a method for accurately measuring a parameter of that sample volume and/or topography or performing a task related to the sample volume and/or topography, the method including the following steps:
    performing an initial operation to produce data representative of the bounding volumetric and/or topographic elements of the sample volume and/or topography, wherein the initial operation is performed using the non scanning probe functionality of the system or using external guide data,
    storing the data representative of the bounding volume and/or topography, any parametric representation, and/or simultaneous parametric representation and/or any element of that volume or topography,
    performing a first scan, by the probe, based on the information previously obtained, and
    measuring a portion or all of the volume or topography or any other parameter associated with the volume or topography or making any change to said volume or topography.

7. The method of claim 6 wherein the first scan produces volume or topographic data by at least one of an atomic force measurement and a tunneling current measurement.

8. The method of claim 6, and further comprising providing a second scan that is used to modify the sample volume and/or topography.

9. The method of claim 8 wherein the modification is accomplished by the probe mechanically cutting the sample volume.

10. In a scanning probe microscope and/or nanomachining system having scanning probe functionality and non-scanning-probe functionality, the system including a probe and/or tool, the probe and/or tool collectively being referred to as the probe, positioned relative to a sample volume or topography and having relative motion between the probe and the sample volume and/or topography in the X, Y and Z space and controlled and sensed in desired directions with respect to the sample volume and/or topography and/or any element thereof, the sample volume and/or topography and/or any element thereof collectively being referred to as the sample volume and/or topography, and producing data responsive to any element or property of said sample volume and/or topography, a method for accurately measuring a parameter of the sample volume and/or topography and/or performing a task related to the sample volume and/or topography, the method including the following steps:
    providing a first location, by using the probe, on regions around/on or within the sample volume and/or topography in X, Y and Z to locate the volumetric and/or topographic elements of a starting reference point or points relative to the sample volume and/or topography, without storing the data representative of the sample volume or topography, any parametric representation, and/or simultaneous parametric representation and/or any element of that sample volume or topography, and measuring a portion or all of the sample volume or topography or any other parameter associated with the sample volume or topography and/or making any change to said sample volume or topography.

11. The method of claim 10 wherein said measuring produces volume data by at least one of an atomic force measurement and a tunneling current measurement.

12. The method of claim 10 wherein said measuring produces volume data by a scanning electron beam probe measurement or a scanning ion beam probe measurement.

13. The method of claim 10, and further comprising providing a second scan that is used to modify the volume and/or topography.

14. The method of claim 13 wherein the modification is accomplished by the probe mechanically cutting the volume of the sample.

15. In a scanning probe microscope and/or nanomachining system, the system including one or more SPM probes and/or tools, the one or more SPM probes and/or tools collectively being referred to as the probe, positioned relative to a sample and having relative motion between the probe and the sample in the X, Y and Z space and controlled and sensed in desired directions with respect to the sample and/or any element thereof, the sample and/or any element thereof collectively being referred to as the sample, and producing data responsive to the sample and/or a property of the sample, a method for accurately measuring a parameter of the sample or performing a task related to the sample, the method comprising:
    performing an inspection of the sample using the probe to produce SPM inspection data representative of a true surface of the sample, the true surface including at least one portion that is a non-function wherein for at least one pair of x,y coordinate values, there is more then one z coordinate value; and
    using the inspection data to perform an additional SPM operation on the sample.

16. The method of claim 15 wherein:
    the inspection data is geometric data that characterizes the true surface; and
    the additional SPM operation is based directly on the geometric data.

17. The method of claim 15 wherein:
    the inspection data is parametric data that characterizes values of a parameter; and
    the additional SPM operation is based on the parametric data.

18. The method of claim 15, and further comprising generating guide data based on the inspection data, wherein the additional SPM operation is based on the guide data.

19. The method of claim 18 wherein the inspection data used to generate the guide data only represents a boundary of the sample.

20. The method of claim 19, and further comprising repeating said performing an inspection of the sample, said generating guide data, and said performing an additional SPM operation.

21. The method of claim 18 wherein generating the guide data comprises:
    comparing the inspection data with target data; and
    if the target data and the inspection data do not match within a predefined tolerance level, generating guide data for guiding the performance of a modification that needs to be made to the sample to fall within the tolerance level.

22. In a scanning probe microscope and/or nanomachining system having scanning probe functional elements and non-scanning-probe functional elements, the system including one or more SPM probes and/or tools, the one or more SPM probes and/or tools collectively being referred to as the probe, positioned relative to a sample and having relative motion between the probe and the sample in the X, Y and Z space and controlled and sensed in desired directions with respect to the sample and/or any element thereof, the sample and/or any element thereof collectively being referred to as the sample, and producing data responsive to the sample and/or a property of the sample, a method for accurately measuring a parameter of the sample or performing a task related to the sample, the method comprising:
    performing an inspection of the sample using the probe to produce SPM inspection data representative of the sample;
    using the inspection data to locate and identify a reference point on the existing sample;
    receiving guide data from one of the non-scanning-probe functional elements, the guide data being independent of the inspection data; and
    using the reference point and the guide data to perform an additional SPM operation on the sample.

23. The method of claim 22 wherein the inspection data represents a true surface of the sample, the true surface including at least one portion that is a non-function wherein for at least one pair of x,y coordinate values, there is more then one z coordinate value.

24. The method of claim 22 wherein the reference point is located and identified by comparing the inspection data with target data for the sample.

25. In a scanning probe microscope and/or nanomachining system having scanning probe functionality and non-scanning-probe functionality,
    the system including a probe and/or tool, the probe and/or tool collectively being referred to as the probe,
    the probe being positioned relative to a sample volume and/or topography and having relative motion between the probe and the sample volume and/or topography in the x, y and z space and controlled and sensed in desired directions with respect to the sample volume and/or topography and/or any element thereof, the sample volume and/or topography and/or any element thereof collectively being referred to as the sample volume and/or topography, and
    the probe producing data responsive to the sample volume and/or topography and/or a property of the sample volume and/or topography,
    a method for accurately measuring a parameter of the sample volume and/or topography or performing a task related to the sample volume and/or topography, the method including:
    performing an initial operation to position the probe relative to the sample volume and/or topography in the x and y coordinates wherein the initial operation is performed using the non-scanning-probe functionality of the system or using external guide data; and
    performing at least one scanning probe operation with the probe to determine the z-coordinate of the surface of the sample volume and/or topography and to (a) produce data representing the sample volume and/or topography and/or a property of the sample volume and/or topography, and/or (b) modify the sample volume and/or topography.

26. The method of claim 25 wherein the initial operation is performed using the non-scanning-probe functionality of the system.

27. The method of claim 25 wherein the initial operation is performed using external guide data.

28. The method of claim 25, and further comprising performing at least one additional scanning probe operation with the probe based on the information previously obtained.

29. The method of claim 25 wherein:

the at least one scanning probe operation is a scan, by the probe, on the sample volume in x, y and z to produce data representative of a true surface of the sample volume, the true surface including at least one portion that is a non-function wherein for at least one pair of x,y coordinate values, there is more then one z coordinate value; and the method further comprises storing the data representative of the sample volume, and/or data representative of any parametric representation of the sample volume.

30. The method of claim 25 wherein:

the method further comprises storing the data representative of the sample volume, and/or data representative of any parametric representation of the sample volume.

31. The method of claim 30 wherein the at least one scanning probe operation produces volume data by at least one of an atomic force measurement and a tunneling current measurement.

* * * * *